US008743690B1

(12) United States Patent
Janarthanan et al.

(10) Patent No.: US 8,743,690 B1
(45) Date of Patent: Jun. 3, 2014

(54) SELECTIVE PACKET SEQUENCE ACCELERATION IN A NETWORK ENVIRONMENT

(75) Inventors: Bhagatram Yaugand Janarthanan, Karnataka (IN); Robert A. Mackie, Cary, NC (US); Tzu-Ming Tsang, Chapel Hill, NC (US); Walter Dixon, Fuquay Varina, NC (US)

(73) Assignee: Cisco Technology, Inc., San Jose, CA (US)

( * ) Notice: Subject to any disclaimer, the term of this patent is extended or adjusted under 35 U.S.C. 154(b) by 248 days.

(21) Appl. No.: 13/160,426

(22) Filed: Jun. 14, 2011

(51) Int. Cl.
*H04L 12/56* (2011.01)

(52) U.S. Cl.
USPC .......................................... 370/235; 709/242

(58) Field of Classification Search
None
See application file for complete search history.

(56) References Cited

U.S. PATENT DOCUMENTS

| | | | |
|---|---|---|---|
| 5,151,899 A | | 9/1992 | Thomas et al. |
| 5,371,731 A | | 12/1994 | Pratt et al. |
| 5,898,713 A | | 4/1999 | Melzer et al. |
| 6,496,516 B1 | * | 12/2002 | Dabecki et al. ............... 370/460 |
| 6,522,880 B1 | | 2/2003 | Verma et al. |
| 6,643,621 B1 | | 11/2003 | Dodrill et al. |
| 6,654,792 B1 | | 11/2003 | Verma et al. |
| 6,684,256 B1 | | 1/2004 | Warrier et al. |
| 6,728,266 B1 | | 4/2004 | Sabry et al. |
| 6,829,242 B2 | | 12/2004 | Davison et al. |
| 6,839,767 B1 | * | 1/2005 | Davies et al. ............... 709/232 |
| 6,862,624 B2 | | 3/2005 | Colby et al. |
| 6,917,592 B1 | | 7/2005 | Ramankutty et al. |
| 6,922,411 B1 | | 7/2005 | Taylor |
| 6,968,389 B1 | | 11/2005 | Menditto et al. |
| 7,317,693 B1 | | 1/2008 | Roesch et al. |
| 7,366,189 B2 | | 4/2008 | Davison et al. |
| 7,426,202 B2 | | 9/2008 | Warrier et al. |
| 7,447,765 B2 | | 11/2008 | Aerrabotu et al. |
| 7,496,662 B1 | | 2/2009 | Roesch et al. |

(Continued)

FOREIGN PATENT DOCUMENTS

| | | |
|---|---|---|
| EP | 1250022 | 10/2002 |
| EP | 1619917 | 1/2006 |

(Continued)

OTHER PUBLICATIONS

3GPP TR 25.820 v8.0.0 (Mar. 2008), 3rd Generation Partnership Project; Technical Specification Group Radio Access Networks; 3G Home NodeB Study Item Technical Report (Release 8); http://www.3gpp.org, 2008. 37 pages.

(Continued)

*Primary Examiner* — Timothy J Weidner
(74) *Attorney, Agent, or Firm* — Patent Capital Group

(57) ABSTRACT

At least one first frame of a first data flow is inspected by a general processing unit to at least determine whether a subsequent portion of the first data flow can be delegated to a network processing unit for accelerated processing. A deceleration trigger is defined for the first data flow from the inspection of the first frame. A first subsequent portion of the first data flow is delegated to a network processing unit for accelerated processing based, at least in part, on the defining of the first deceleration trigger. The first deceleration trigger defines at least one first condition that, when met during accelerated processing of the first data flow, prompts returning processing of the first data flow from the network processing unit to the general processing unit for further inspection of subsequent packets.

19 Claims, 18 Drawing Sheets

(56) References Cited

U.S. PATENT DOCUMENTS

| | | | |
|---|---|---|---|
| 7,502,836 B1 | 3/2009 | Menditto et al. | |
| 7,522,521 B2* | 4/2009 | Bettink et al. | 370/230 |
| 7,610,330 B1 | 10/2009 | Quinn et al. | |
| 7,673,072 B2* | 3/2010 | Boucher et al. | 709/245 |
| 7,742,399 B2 | 6/2010 | Pun | |
| 7,768,983 B2 | 8/2010 | Nylander et al. | |
| 7,792,113 B1 | 9/2010 | Foschiano et al. | |
| 7,808,919 B2 | 10/2010 | Nadeau et al. | |
| 7,827,256 B2 | 11/2010 | Phillips et al. | |
| 7,856,512 B2 | 12/2010 | Hilla et al. | |
| 7,885,248 B2 | 2/2011 | Harper et al. | |
| 7,885,260 B2 | 2/2011 | Paul et al. | |
| 7,890,636 B2 | 2/2011 | Grayson et al. | |
| 7,925,709 B1 | 4/2011 | Ben-Yoseph et al. | |
| 7,926,071 B2 | 4/2011 | Stephens et al. | |
| 7,929,442 B2* | 4/2011 | Connor et al. | 370/235 |
| 7,990,993 B1 | 8/2011 | Ghosh et al. | |
| 8,018,866 B1* | 9/2011 | Kasturi et al. | 370/252 |
| 8,086,253 B1 | 12/2011 | Kalmkar et al. | |
| 8,279,776 B1 | 10/2012 | Everson et al. | |
| 8,339,959 B1* | 12/2012 | Moisand et al. | 370/235 |
| 2002/0053029 A1 | 5/2002 | Nakamura et al. | |
| 2003/0028433 A1 | 2/2003 | Merriman et al. | |
| 2003/0028644 A1 | 2/2003 | Maguire et al. | |
| 2003/0097481 A1 | 5/2003 | Richter | |
| 2004/0054925 A1 | 3/2004 | Etheridge et al. | |
| 2004/0088385 A1 | 5/2004 | Blanchet et al. | |
| 2004/0224678 A1 | 11/2004 | Dahod et al. | |
| 2004/0236855 A1 | 11/2004 | Peles | |
| 2005/0013253 A1 | 1/2005 | Lindskog et al. | |
| 2005/0025152 A1 | 2/2005 | Georgiou et al. | |
| 2005/0058153 A1 | 3/2005 | Santhoff et al. | |
| 2005/0074005 A1 | 4/2005 | Okuno | |
| 2005/0088974 A1 | 4/2005 | Savoor et al. | |
| 2005/0091371 A1 | 4/2005 | Delegue et al. | |
| 2005/0096016 A1 | 5/2005 | Tervo et al. | |
| 2005/0120091 A1 | 6/2005 | Casais et al. | |
| 2005/0239473 A1 | 10/2005 | Pan et al. | |
| 2005/0246346 A1 | 11/2005 | Gerdes et al. | |
| 2005/0286504 A1 | 12/2005 | Kwon | |
| 2006/0018328 A1 | 1/2006 | Mody et al. | |
| 2006/0029084 A1 | 2/2006 | Grayson | |
| 2006/0058021 A1 | 3/2006 | Fox et al. | |
| 2006/0098573 A1* | 5/2006 | Beer et al. | 370/230 |
| 2006/0222086 A1 | 10/2006 | Frye | |
| 2006/0224750 A1 | 10/2006 | Davies et al. | |
| 2006/0234678 A1 | 10/2006 | Juitt et al. | |
| 2006/0256722 A1 | 11/2006 | Taha et al. | |
| 2006/0268901 A1 | 11/2006 | Choyi et al. | |
| 2006/0291388 A1 | 12/2006 | Amdahl et al. | |
| 2007/0014245 A1* | 1/2007 | Aloni et al. | 370/252 |
| 2007/0027992 A1 | 2/2007 | Judge et al. | |
| 2007/0067839 A1 | 3/2007 | Hamada et al. | |
| 2007/0078955 A1 | 4/2007 | Siliquini et al. | |
| 2007/0097983 A1 | 5/2007 | Nylander et al. | |
| 2007/0101421 A1 | 5/2007 | Wesinger et al. | |
| 2007/0105568 A1 | 5/2007 | Nylander et al. | |
| 2007/0116019 A1 | 5/2007 | Cheever et al. | |
| 2007/0116020 A1 | 5/2007 | Cheever et al. | |
| 2007/0201383 A1 | 8/2007 | Ong et al. | |
| 2007/0208820 A1 | 9/2007 | Makhervaks et al. | |
| 2007/0243872 A1 | 10/2007 | Gallagher et al. | |
| 2007/0253328 A1 | 11/2007 | Harper et al. | |
| 2007/0271453 A1 | 11/2007 | Pohja et al. | |
| 2007/0298848 A1 | 12/2007 | Babin | |
| 2008/0010354 A1 | 1/2008 | Sasaki et al. | |
| 2008/0026740 A1 | 1/2008 | Netanel | |
| 2008/0045267 A1 | 2/2008 | Hind et al. | |
| 2008/0114862 A1 | 5/2008 | Moghaddam et al. | |
| 2008/0133518 A1 | 6/2008 | Kapoor et al. | |
| 2008/0137541 A1 | 6/2008 | Agarwal et al. | |
| 2008/0147837 A1 | 6/2008 | Klein et al. | |
| 2008/0162637 A1 | 7/2008 | Adamczyk et al. | |
| 2008/0176582 A1 | 7/2008 | Ghai et al. | |
| 2008/0177880 A1 | 7/2008 | Ginis | |
| 2008/0188223 A1 | 8/2008 | Vesterinen et al. | |
| 2008/0298309 A1 | 12/2008 | Dahod et al. | |
| 2008/0301254 A1 | 12/2008 | Bestler | |
| 2008/0310404 A1 | 12/2008 | Valme et al. | |
| 2008/0316980 A1 | 12/2008 | Ahlen et al. | |
| 2009/0017864 A1 | 1/2009 | Keevill et al. | |
| 2009/0061821 A1 | 3/2009 | Chen et al. | |
| 2009/0061873 A1 | 3/2009 | Bao et al. | |
| 2009/0067417 A1 | 3/2009 | Kalavade et al. | |
| 2009/0086742 A1 | 4/2009 | Ghai et al. | |
| 2009/0089447 A1 | 4/2009 | Balachandran et al. | |
| 2009/0092136 A1 | 4/2009 | Nazareth et al. | |
| 2009/0098872 A1 | 4/2009 | Deshpande et al. | |
| 2009/0109849 A1* | 4/2009 | Wood et al. | 370/235 |
| 2009/0109982 A1 | 4/2009 | Batz et al. | |
| 2009/0129271 A1 | 5/2009 | Ramankutty et al. | |
| 2009/0156213 A1 | 6/2009 | Spinelli et al. | |
| 2009/0161680 A1 | 6/2009 | Ishikawa et al. | |
| 2009/0164597 A1 | 6/2009 | Shuster | |
| 2009/0207759 A1 | 8/2009 | Andreasen et al. | |
| 2009/0215438 A1 | 8/2009 | Mittal et al. | |
| 2009/0254658 A1 | 10/2009 | Kamikura et al. | |
| 2009/0262682 A1 | 10/2009 | Khetawat et al. | |
| 2009/0279522 A1 | 11/2009 | Leroy et al. | |
| 2009/0286510 A1 | 11/2009 | Huber et al. | |
| 2010/0010991 A1 | 1/2010 | Joshi | |
| 2010/0067462 A1 | 3/2010 | Beser et al. | |
| 2010/0077102 A1 | 3/2010 | Lim et al. | |
| 2010/0082787 A1 | 4/2010 | Kommula et al. | |
| 2010/0091653 A1 | 4/2010 | Koodli et al. | |
| 2010/0091775 A1 | 4/2010 | Yamamoto | |
| 2010/0103871 A1 | 4/2010 | Mooney et al. | |
| 2010/0124933 A1 | 5/2010 | Chowdhury et al. | |
| 2010/0131646 A1 | 5/2010 | Drako | |
| 2010/0174829 A1 | 7/2010 | Drako | |
| 2010/0195640 A1 | 8/2010 | Park et al. | |
| 2010/0278070 A1 | 11/2010 | Melia et al. | |
| 2010/0291897 A1 | 11/2010 | Ghai et al. | |
| 2011/0021192 A1 | 1/2011 | Grayson et al. | |
| 2011/0021196 A1 | 1/2011 | Grayson et al. | |
| 2011/0058479 A1 | 3/2011 | Chowdhury et al. | |
| 2011/0069663 A1 | 3/2011 | Shu et al. | |
| 2011/0075557 A1 | 3/2011 | Chowdhury et al. | |
| 2011/0075675 A1 | 3/2011 | Koodli et al. | |
| 2011/0076985 A1 | 3/2011 | Chami et al. | |
| 2011/0145103 A1 | 6/2011 | Ljunggren et al. | |
| 2011/0182249 A1 | 7/2011 | Yang et al. | |
| 2011/0185049 A1 | 7/2011 | Atreya et al. | |
| 2011/0225284 A1 | 9/2011 | Savolainen | |
| 2011/0235546 A1 | 9/2011 | Horn et al. | |
| 2011/0235595 A1 | 9/2011 | Mehta et al. | |
| 2011/0295942 A1* | 12/2011 | Raghunath et al. | 709/203 |
| 2012/0002543 A1* | 1/2012 | Dighe et al. | 370/232 |
| 2012/0076120 A1 | 3/2012 | Kovvali et al. | |
| 2012/0082073 A1 | 4/2012 | Andreasen et al. | |
| 2012/0082093 A1 | 4/2012 | Andreasen et al. | |
| 2012/0082094 A1 | 4/2012 | Andreasen et al. | |
| 2012/0082132 A1 | 4/2012 | Andreasen et al. | |
| 2012/0082146 A1 | 4/2012 | Andreasen et al. | |
| 2012/0082161 A1 | 4/2012 | Leung et al. | |
| 2012/0184258 A1 | 7/2012 | Kovvali et al. | |
| 2012/0224536 A1 | 9/2012 | Hahn et al. | |
| 2013/0041934 A1* | 2/2013 | Annamalaisami et al. | 709/203 |
| 2013/0258963 A1 | 10/2013 | Mihaly et al. | |

FOREIGN PATENT DOCUMENTS

| | | |
|---|---|---|
| EP | 1978685 | 10/2008 |
| WO | WO 92/07438 | 4/1992 |
| WO | WO 92/14327 | 8/1992 |
| WO | WO2005/015825 | 2/2005 |
| WO | WO 2009/089455 | 7/2009 |

(56) References Cited

FOREIGN PATENT DOCUMENTS

| WO | WO2009/132700 | 11/2009 |
|---|---|---|
| WO | WO2011/062745 | 5/2011 |
| WO | WO2011/062746 | 5/2011 |

OTHER PUBLICATIONS

3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.
3GPP TS 22.011 v8.4.1 (Jun. 2008), 3rd Generation Partnership Project; Technical Specification Group Services and System Aspects; Service accessibility (Release 8), Global System for Mobile Communications, http://www/3gpp.org, 2008. 25 pages.
3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.
3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.
3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www,3gpp.org, 2008. 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.
3GPP TS 23.236 v7.0.0 (Dec. 2006), 3rd Generation Partnership Project; Technical Specification Grpup Services and System Aspects; Intra-domain connection of Radio Access Network (RAN) nodes to multiple Core Network (CN) nodes (release 7); Global System for Mobile Communications, http://www.3gpp.org, 2006. 37 pages.
3GPP TS 25.411 v7.1.0 (Sep. 2007); 3rd Generation Partnership Project; Technical Specification Group Radio Access Network; UTRAN lu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN lu interface RANAP signaling (Release 7), http://www.3gpp.org, 2007. 359 pages.
3GPP TS 25.415 v7.3.0 (Dec. 2006), 3rd Generation Partnership Project; Technical Specification Group Radio Access Network; UTRAN lu interface user plane protocols (Release 7), http://www.3gpp.org, 2006. 64 pages.
3GPP TS 29.163 v8.3.0 (May 2008), 3rd Generatinon Partnership Project; Technical Specification Group Core Network and Terminals; Interworking between the IP Multimedia (IM) Core Network (CN) subsystem and Circuit Switched (CS) networks (Release 8), Global System for Mobile Communications, http://3gpp.org, 2008. 237 pages.
3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF) -IM Media Gateway; Mn Interface (Release 8), http://www.3gpp.org, 2008. 73 pages.
3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.

3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
3GPP TS.23.203 v.11.3.0 Technical Specification—"3rd Generation Partnership Project; Technical Specification Group Services and System Aspects; Policy and Charging control architecture (Release 11)," Sep. 2011; 167 pages.
3GPP TS.23.401 v.10.5.0 Technical Specification—"3rd Generation Partnership Project; Technical Specification Group Services and System Aspects; General Packet Radio Service (GPRS) enhancements for Evolved Universal Terrestrial Radio Access Network (E-UTRAN) access (Release 10)," Sep. 2011, 284 pages.
3GPP TS 23.236 v.10.0.0 Technical Specification—"3rd General Partnership Project; Technical Specification Group Services and Systems Aspects; Intra-Domain Connnection of Radio Access Network (RAN) Nodes to Multiple Cor Network (CN) Nodes (Release 10)," Mar. 2010, 39 pages.
Chowdhury, K. "Fast Handoff Support for HRPD," 3rd Generation Partnership Project 2, 3GPP2, Apr. 24, 2006.
Chowdhury, K. "Network-Based Layer 3 Connectivity and Mobility Management for IPv6," draft-chowdbury-netmip6-01.txt, Network Working Group Internet Draft, Sep. 8, 2006, 20 pages http://tools.ietf.org/html/draft-chowdbury-netmip6-01.
Chowdhury, K., "Network Based L3 Connectivity and Mobility Management for IPv4," draft-chowdbury-netmip4-001.tt, Feb. 25, 2006; 16 pages http://tools.ietf.org/html/draft-chowdbury-netmip4-00.
Devarapalli, V., et al., "Proxy Mobile IPv6 and Mobil IPv6 Interworking," draft-devarapalli-netlmm-pmipv6-mipv6-00.txt, NETLMM Working Group Internet Draft, Apr. 10, 2007; 9 pages http://tools,ietf.org/html/draft-devarapalli-netlmm-pmipv6-00.
Lior, A., et al., "Mobile IP Key Derivation using EAP," draft-lior-mipkeys-eap-00, Network Working Group, Feb. 25, 2006; 17 pages http://tools.ietf.org/html/draft-lior-mipkeys-eap-00.
Navali, J., et al., "IPv6 over Network based Mobile IPv4," draft-navali-ip6-over-netmip4-00.txt, Network Working Group, Feb. 25, 2006; 20 pages http://tools.ietf.org/html/draft-navali-ip6-over-netmip4-00.
3GPP TS 23.261 v.10.1.0 Technical Specification—3GPP Organizational Partners, $3^{rd}$ Generation Partnership Project; Technical Specification Group Services and System Aspects; IP flow mobility and seamless Wireless Local Area Network (WLAN) offload; Stage 2 (Release 10); © 2010, 22 pages; http://www.3gpp.org.
3GPP TR 23.829 v.10.0—3GPP Organizational Partners, $3^{rd}$ Generation Partnership Partnership Project; Technical Specification Group Services and System Aspects; Local IP Access and Selected IP Traffic Offload (LIPA-SIPTO) (Release 10); 3GPP TR 23.829 V10.0.0 (Mar. 2011) © 2011, 43 pages; http://www.3gpp.org.
User Agent Profile (UAProf) Specification, Wireless Application Group, Wireless Application Protocol Forum, Version 10, Nov. 1999, 76 pages.
"3rd Generation Partnership Project; Technical Specification Group Core Network and Terminals; Policy and Charging Control over Gx reference point (Release 9)," 3GPP Standard; 3GPP TS 29.212, 3rd Generational Partnership Project (3GPP), Mobile Competence Centre; 650, Route Des Lucioles; F-06921 Sophia-Antipolis Cedex; France, No. V9.0.0, Sep. 1, 2009; 92 pages.
Cisco Systems, Inc., "Cisco NAC Appliance—Clean Access Manager Installation and Configuration Guide," Jul. 2009, 5 pages http://www.cisco.com/en/US/docs/security/nac/appliance/configuration_guide/461/cam/cam461ug.pdf.
Cisco Systems, Inc., "Cisco NAC Appliance—Clean Access Server Installation and Configuration Guide, Rel. 4.6(1)," Jul. 2009, 3 pages http://www.cisco.com/en/US/docs/security/nac/appliance/configuration_guide/461/cas/cas461ug.pdf.
PCT Mar. 1, 2011 Notification of Transmittal (1 page) of the International Search Report (4 pages) and the Written Opinion of the International Searching Authority, or the Declaration (6 pages) for PCT/US2010/054834.

(56) References Cited

OTHER PUBLICATIONS

PCT May 31, 2012 International Preliminary Report on Patentability and Written Opinion of the International Searching Authority (8 pages) for PCT/US2010/054834.

PCT Feb. 8, 2011 Notification of Transmittal (1 page) of the International Search Report (4 pages) and the Written Opinion of the International Searching Authority, or the Declaration (7 pages) for PCT/US2010/054838.

PCT May 30, 2012 International Preliminary Report on Patentability and Written Opinion of the International Searching Authority (8 pages) for PCT/US2010/054838.

"3GPP TS 23.203 V9.2.0 (Sep. 2009) Technical Specification $3^{rd}$ Generation Partnership project; Technical Specification Group Services and System Aspects; Policy and Charging Control Architecture (Release 9)," 3GPP TS 23.203 V9.2.0, vol. 23, 203, No. V9.2.0; Sep. 1, 2009, 120 pages URL:ftp://ftp.3.gpp.org/specs/archive/23_series/23.203/.

EPO Aug. 22, 2012 Response to Communication re Rules 161(1) and 162 EPC from European Application No. 10779130; 8 pages.

Cisco Systems, Inc., Configuring URL Routing (L5 Routing) on the CSS 11000 and 11500, © 1992-2006; Document ID: 25999; 5 pages http://www.cisco.com/en/US/products/hw/contnetw/ps792/products_configuration_example09186a00801c0dbc.shtml.

Cisco Systems, Inc., "Cisco Application-Oriented Networking," © 1992-2006; 10 pages http://www.cisco.com/en/US/prod/collateral/modules/ps6438/product_data_sheet0900aecd802c1f9c.html.

Ericsson, Tdoc S2-000888; "SGSN decomposition," Document for discussion; R000 Architecture; 3GPP TSG SA2 Meeting #13 ; Berlin, May 22-26, 2000, 13 pages; http://www.3gpp.org/ftp/tsg_sa/WG2_Arch/TSGS2_13/tdocs/S2-000888.zip.

EPO Oct. 1, 2013 Communication from European Application Serial No. 10779129.5.

"Stoke Mobile Data Offload Solution Brief," © 2009 Stoke, Inc.; Aug. 2009, 4 pages; [Retrieved and printed Nov. 14, 2013] stoke.com/GetFile.asp?f=a08fed265abc46434edf6763307c1078.

\* cited by examiner

US 8,743,690 B1

SELECTIVE PACKET SEQUENCE ACCELERATION IN A NETWORK ENVIRONMENT

TECHNICAL FIELD

This disclosure relates in general to the field of communications and, more particularly, to optimizing processing of packets in a network environment.

BACKGROUND

Networking architectures have grown increasingly complex in communications environments, particularly mobile wireless environments. Mobile data traffic has grown extensively in recent years; the types of data being transported through mobile wireless networks have also changed dramatically. Video, file-sharing, and other types of usages (more traditionally associated with wired networks) have been gradually displacing voice as the dominant traffic in mobile wireless networks. In addition, the augmentation of clients or end users wishing to communicate in a network environment has caused many networking configurations and systems to respond by adding elements to accommodate the increase in networking traffic. As the subscriber base of end users increases, proper routing and efficient management of communication sessions and data flows become even more critical. Hence, there is a significant challenge in coordinating which flows merit particular processing in order to minimize resources and expenses associated with optimally managing network traffic. In some instances, deep packet inspection (DPI) operations can be performed by network elements in a communication environment, including processing and routing based on the inspection of header and payload data. DPI can be used, for example, to search for protocol non-compliance, identify commercial services accessed, search for viruses, malware, spam, intrusions attempts, or other predefined criteria and use the data gathered to take particular action using the packet, including the collection of statistical information for a data flow.

BRIEF DESCRIPTION OF THE DRAWINGS

Like reference numbers and designations in the various drawings indicate like elements.

DETAILED DESCRIPTION OF EXAMPLE EMBODIMENTS

Overview

Figure 1:
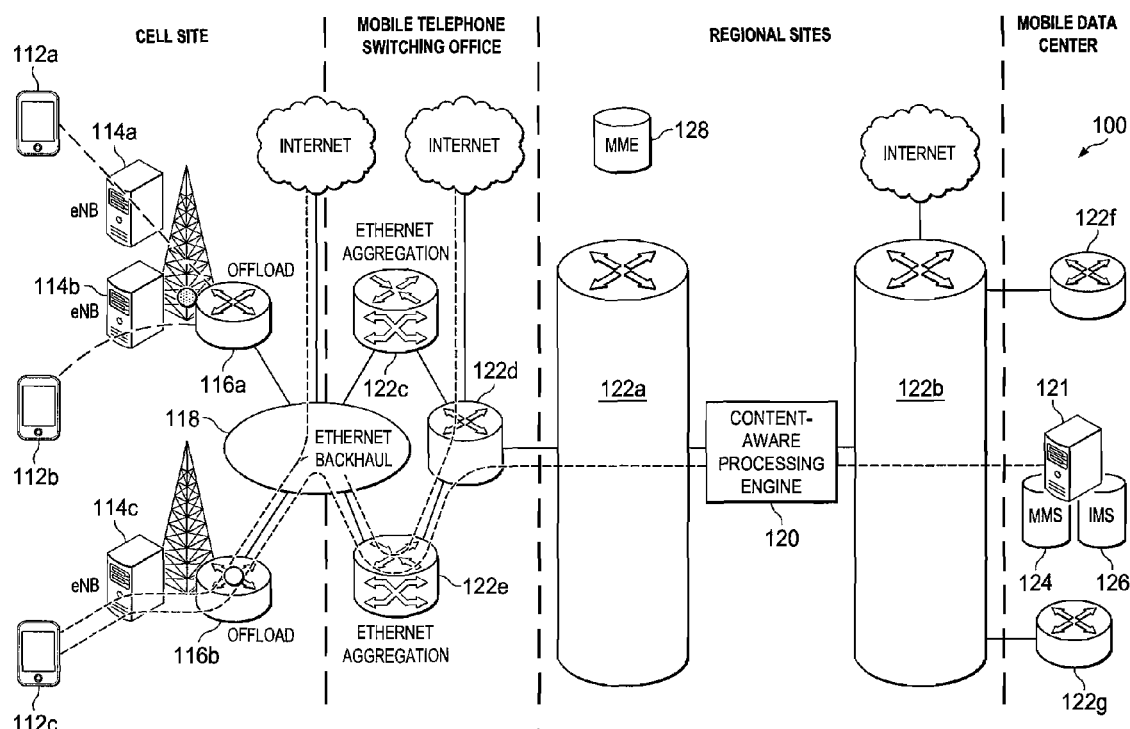
FIG. 1 is a simplified schematic diagram of a communication system for providing selective packet acceleration in a network environment in accordance with one embodiment of the present disclosure.

In general, one aspect of the subject matter described in this specification can be embodied in methods that include the actions of inspecting at least one first frame of a first data flow by a general processing unit to at least determine whether a subsequent portion of the first data flow can be delegated to a network processing unit for accelerated processing. A deceleration trigger can be defined for the first data flow from the inspection of the first frame. A first subsequent portion of the first data flow can be delegated to a network processing unit for accelerated processing based, at least in part, on the defining of the first deceleration trigger. The first deceleration trigger can define at least one first condition that, when met during accelerated processing of the first data flow, prompts returning processing of the first data flow from the network processing unit to the general processing unit.

In another general aspect of the subject matter described in this specification can be embodied in systems that include at least one memory element storing data, at least one network processor, and at least one general processor. The at least one network processor can be configured to perform accelerated processing of a frames in a received data flow. The at least one general processor can be configured to perform a set of deep packet inspection operations on at least a particular portion of frames of the received data flow, define, from the deep packet inspection, at least one deceleration trigger for the received data flow, and determine whether a subsequent portion of the received data flow can be delegated to the network processor for accelerated processing based at least in part on the definition of the at least one deceleration trigger for the received data flow. A deceleration trigger can define at least one condition that, when met, returns processing of an accelerated data flow from the network processor to the general processor.

These and other embodiments can each optionally include one or more of the following features. The first subsequent portion of the first data flow can be delegated to a network processing unit includes sending acceleration instructions to the network processing unit, the instructions including the first deceleration trigger. The acceleration instructions can be attached to the at least one first frame, and the at least one at least one first frame can be sent to the network processing unit. The network processing unit can strip the acceleration instructions from the first frame prior to forwarding the first frame to a remote computing device. At least one particular frame of a second data flow can be inspected by the general processing unit to at least determine whether a subsequent portion of the second data flow can be delegated to the network processing unit for accelerated processing. It can be determined, from the inspection of the particular packet, that no deceleration triggers are available for the second data flow. It can be further determined that the second data flow cannot be accelerated based, at least in part, on the determination that no deceleration triggers are available for the second data flow. Each subsequent frame in the second data flow can be processed using the general processing unit in response to the determination that the second data flow cannot be accelerated. A particular frame in the first data flow can be forwarded to the general processing unit by the network processing unit in response to the first deceleration trigger being met, wherein the particular frame was received by the general processing unit after delegation of the first subsequent portion of the first data flow to the network processing unit for accelerated processing. The particular frame can be inspected, using the general processing unit, to at least determine whether another subsequent portion of the first data flow can be delegated to the network processing unit for accelerated processing. A second deceleration trigger can be defined for the first data flow from the inspection of the particular frame. Another subsequent portion of the first data flow can be delegated to the network processing unit for accelerated processing based, at least in part, on the defining of the second deceleration trigger. It can be determined, from the deep packet inspection of the particular frame, that no additional deceleration triggers are available for the first data flow, and determined that other subsequent portions of the first data flow cannot be accelerated based, at least in part, on the determination that no additional deceleration triggers are available for the first data flow.

Further, embodiments can each optionally include one or more of the following additional features. The general processing unit can define the first deceleration trigger. Accelerated processing of the first subsequent portion of the first data flow can include receiving each frame in the first subsequent portion at the network processing unit and forwarding each frame in the first subsequent portion to at least one remote computing device using the network processing unit, where accelerated processing of the first subsequent portion results in each frame in the first subsequent portion being forwarded by the network processing unit without processing by the general processing unit. The deceleration trigger can be a time-based trigger. In some instances, the deceleration trigger can be a data volume-based trigger. The at least one first frame can be received from a remote computing device via the network processing unit. The at least one first frame can be forwarded to a remote computing device, via the network processing unit, following the deep packet inspection of the at least one first frame. In some implementations, the network processing and general processing units can be included in a gateway router for a network. Further, an in-band communication link can be provided between the network processor and the general processor, as well as an out-of-band communication link between the network processor and the general processor.

Some or all of the features may be computer-implemented methods or further included in respective systems or other devices for performing this described functionality. The details of these and other features, aspects, and implementations of the present disclosure are set forth in the accompanying drawings and the description below. Other features, objects, and advantages of the disclosure will be apparent from the description and drawings, and from the claims.

Example Embodiments

Turning to FIG. 1, a simplified block diagram of an example embodiment of a communication system 100, which can be associated with a mobile wireless network. The example architecture of FIG. 1 includes multiple instances of user equipment (UE) 112a-c: each of which may connect wirelessly to a respective base station, such as an eNode B (eNB), 114a-c. Each base station 114a-c may be connected to a network element 116a-b, which can be tasked with providing offload functionalities for the architecture. Network elements 116a-b can be connected to an Ethernet backhaul 118. Communication system 10 can also include various network elements 122a-g, which can be used to exchange packets in a network environment. As illustrated, the architecture of communication system 110 can be logically broken into a cell site segment, a mobile telephone switching office (MTSO) segment, a regional sites segment, and a mobile data center (DC) segment.

A content aware packet processing engine 120, such as a network or service gateway, may also be connected to Ethernet backhaul 118 and a mobile data center 121 through one or more intermediate network elements. The mobile data center may include a Multimedia Messaging Service (MMS) 124 and an Internet protocol (IP) Multimedia Subsystem (IMS) 126. A Mobility Management Entity (MME) 128 is also provided for facilitating user interaction, such as tracking user equipment and authenticating users. Other networks, including an instantiation of the Internet, may be connected to the mobile wireless network at several locations, including at various network elements and Ethernet backhaul 118.

Each of the elements of FIG. 1 may couple to one another through simple interfaces (as illustrated) or through any other suitable connection (wired or wireless), which provides a viable pathway for network communications. Additionally, any one or more of these elements may be combined or removed from the architecture based on particular configuration needs. Communication system 100 may include transmission control protocol/Internet protocol (TCP/IP) communications for the transmission or reception of packets in a network, and may also operate in conjunction with a user datagram protocol/IP (UDP/IP), IP (including ARP and required L2 protocols, such as spanning tree protocol (STP), etc.), or any other suitable protocol where appropriate and based on particular needs.

Communication system 100 may be tied, for example, to the 3rd Generation Partnership Project (3GPP) Evolved Packet System architecture, but alternatively this depicted architecture may be equally applicable to other environments. In general terms, 3GPP defines the Evolved Packet System (EPS) as specified in TS 23.401, TS.23.402, TS 23.203, etc. The EPS consists of IP access networks and an Evolved Packet Core (EPC). Access networks may be 3GPP access networks, such a GERAN, UTRAN, and E-UTRAN, or they may be non-3GPP IP access networks such as digital subscriber line (DSL), Cable, WiMAX, code division multiple access (CDMA) 2000, WiFi, or the Internet. Non-3GPP IP access networks can be divided into trusted and untrusted segments. Trusted IP access networks support mobility, policy, and AAA interfaces to the EPC, whereas untrusted networks do not. Instead, access from untrusted networks is done via the evolved PDG (ePDG), which provides for IPsec security associations to the user equipment over the untrusted IP access network. The ePDG (in turn) supports mobility, policy, and AAA interfaces to the EPC, similar to the trusted IP access networks.

Note that user equipment 112a-c can be associated with clients, customers, or end users wishing to initiate a communication in system 100 via some network. In one particular example, user equipment 112a-c reflects individuals capable of generating wireless network traffic. The term 'endpoint' is inclusive of devices used to initiate a communication, such as a computer, a personal digital assistant (PDA), a laptop or electronic notebook, a cellular telephone, an iPhone, a Blackberry, a smartphone, a tablet, an iPad, an IP phone, or any other device, component, element, equipment, or object capable of initiating voice, audio, video, media, or data exchanges within communication system 100. User equipment 112a-c may also be inclusive of a suitable interface to the human user, such as a microphone, a display, or a keyboard or other terminal equipment. User equipment 112a-c may also be any device that seeks to initiate a communication on behalf of another entity or element, such as a program, a database, or any other component, device, element, or object capable of initiating an exchange within communication system 100. Data, as used herein in this document, refers to any type of numeric, voice, video, media, or script data, or any type of source or object code, or any other suitable information in any appropriate format that may be communicated from one point to another.

For purposes of illustrating certain example techniques of communication system 100, IP networks may provide users with connectivity to networked resources such as corporate servers, extranet partners, multimedia content, the Internet, and any other application envisioned within IP networks. While these networks generally function to carry data plane (user-generated) packets, they may also implicate control plane and management plane packets. Unlike legacy network technologies (e.g., Integrated Service Digital Network (ISDN), Frame Relay, and Asynchronous Transfer Mode (ATM)) that define separate data and control channels, IP networks carry packets within a single pipe. Thus, IP network elements such as routers and switches should generally be able to distinguish between data plane, control plane, and management plane packets, where this enables each packet to be suitably processed. In general, the data plane (also known as the forwarding plane or the user plane) provides the ability to forward data packets; the control plane provides the ability to route data correctly; the management plane provides the ability to manage network elements.

The vast majority of packets handled by a router travel through the router via the data plane. Data plane packets typically consist of end-station, user-generated packets that are forwarded by network devices to other end-station devices. Data plane packets may have a transit destination IP address, and they can be handled by normal, destination IP address-based forwarding processes. Service plane packets are a special case of data plane packets. Service plane packets are also user-generated packets that may be forwarded by network elements to other end-station devices, but they may require high-touch handling by a network element (above and beyond normal, destination IP address-based forwarding) to properly forward the packet. Examples of high-touch handling include such functions as Generic Routing Encapsulation (GRE) encapsulation, quality of service (QoS), Multi-protocol Label Switching (MPLS), virtual private networks (VPNs), and secure socket layer (SSL)/IPsec encryption/decryption. In a mobile network, the data plane may be responsible for packet processing at a session/flow level, multiple flows/session per active user, access control list (ACL)/traffic flow template (TFT) filters per user/flow, tunneling, rate limiting, subscriber scalability, security, Layer 4 (L4) inspection, and Layer 7 (L7) inspection. These activities are typically intensive in terms of memory and packet processing.

Control plane packets commonly include packets that are generated by a network element (e.g., a router or a switch), as well as packets received by the network that may be used for the creation and operation of the network itself. Control plane packets may have a receive destination IP address. Protocols that "glue" a network together, such as address resolution protocol (ARP), border gateway protocol (BGP), and open shortest path first (OSPF), often use control plane packets. In a mobile network, the control plane may be responsible for session management, call setup support requirements, interfacing with external servers (e.g., querying for per-user policy and control information), managing high availability for a gateway, and configuring and managing the data plane. Packet overloads on a router's control plane can inhibit the routing processes and, as a result, degrade network service levels and user productivity, as well as deny specific users or groups of users' service entirely.

Management plane packets also typically include packets that are generated or received by a network element. This may also include packets generated or received by a management station, which are used to manage a network. Management plane packets may also have a receive destination IP address. Examples of protocols that manage a device and/or a network, which may use management plane packets, include Telnet, Secure Shell (SSH), Trivial File Transfer Protocol (TFTP), Simple Network Management Protocol (SNMP), file transfer protocol (FTP), and Network Time Protocol (NTP). Communication system 100 can offer mobility, policy control, authentication, authorization, and accounting (AAA) functions, and charging activities for various network elements. For example, interfaces can be used to exchange point of attachment, location, and access data for one or more end users. Resource, accounting, location, access network information, network address translation (NAT) control, etc. can be exchanged using a remote authentication dial in user service (RADIUS) protocol, a Diameter protocol, a service gateway interface (SGI), terminal access controller access-control system (TACACS), TACACS+, etc.

A content aware packet processing engine 120 can be used to perform a number of scalable content billing and filtering functionality for postpaid and prepaid services in a communication system 100. The packet processing engine 120 can perform deep packet and high-touch functions on packets received and routed through the packet processing engine 120. For instance, packet processing engine 120 can perform select billing, filtering and QoS capabilities for a mobile network provider. In providing some of these capabilities, the packet processing engine 120 may needs to be able to parse and inspect the contents of the packets. Such parsing, inspection, and processing of packets, while valuable can negatively affect overall performance of the packet processing engine 120 and limit the degree of service packet processing engine 120 can be provide using fixed hardware resources in more traditional configurations. Performance of a packet processing engine 120 can be improved, however, by incorporating selective acceleration functionality, as described herein, allowing portions of data flows in need of deeper parsing and inspection to be processed accordingly, while more straightforward portions of the data flow are accelerated through the packet processing engine according to simpler packet forwarding procedures not requiring the specialized processing capabilities of the packet processing engine 120.

Figure 2:
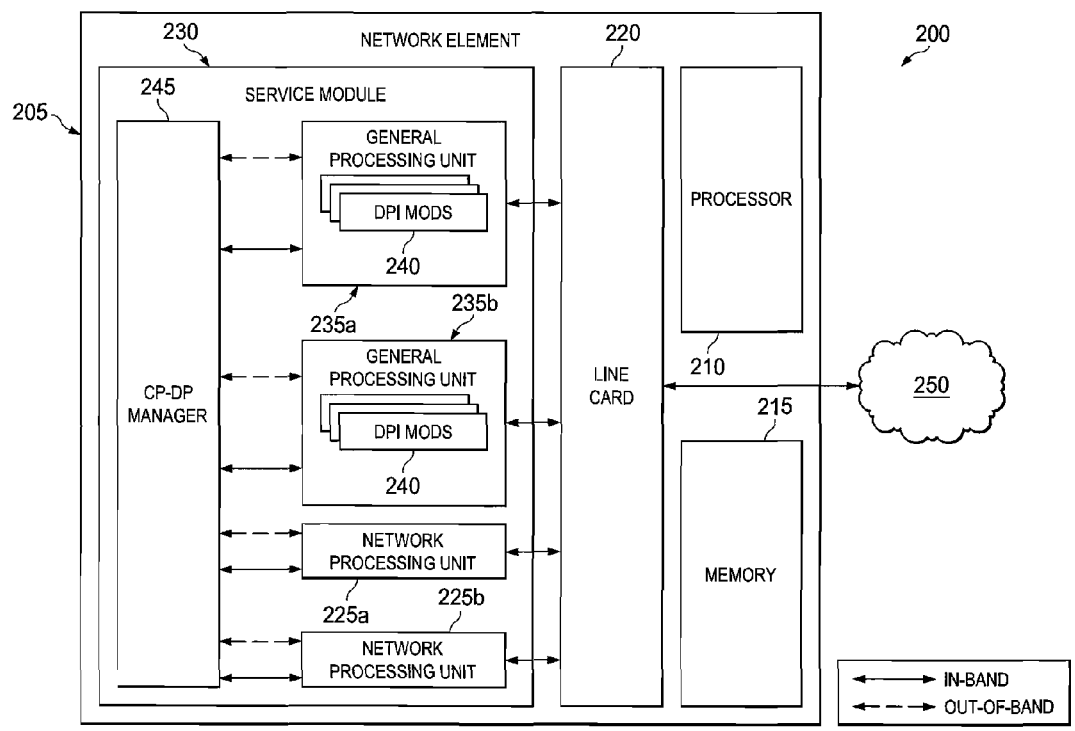
FIG. 2 is a simplified schematic diagram illustrating additional details related to the communication system.

Turning to FIG. 2, a detailed block diagram is shown illustrating potential logical and/or hardware components of a network element 205 implementing, for example, a content aware packet processing engine 120. In some instances, the network element can be a chassis containing one or more cards attached to a backplane. The network element 205 can include at least one processor 210 and at least one memory element 215. In some instances, one or more memory elements can be shared by the various processors (e.g., 210, 225a, 225b, 235a, 235b) or processors can have dedicated memory elements. A line card 220 (or backplane interface element) can be provided interfacing the network element 205 with one or more adjacent network elements or cards in a network 250. The network element 205 can further include one or more network processing units 225a-b adapted to perform basic packet counting and forwarding operations. Network element 205 can further include a service module 230 including one or more general-purpose processing units 235a-b, also interfacing with the line card 250. In other implementations, network processing units 225a-b can be included on line card 220.

In some instances, such as the example shown in FIG. 2, both network processing units 225a-b and general-purpose processing units (GPUs) 235a-b can be included on the same card. In such instances, network processing units 225a-b and general-purpose processing units (GPUs) 235a-b can be interconnected via PCI, FIFOs and shared memory registers. Each GPU 235a-b include deep packet inspection (DPI) modules 240 providing DPI functionality for GPUs 235a-b. A general-purpose processing units 235a-b can be a more robust processor, have different performance metrics, be more adept at processing certain types of information (e.g., tracking L7 transactions, parsing high level protocols, computing complex policy enforcement rules, maintaining large data bases of policy options), and/or be preferred (for other optimization reasons) over network processors 225a-b or other processors in a network 250 to which the network element 205 interfaces. Further, GPUs 235a-b can be tasked with processing related to coordinating hand-offs of a single data flow between GPUs 235a-b and NPUs 225a-b. In some examples, GPUs 235a-b can be implemented using PowerPC, Pentium, Athlon, and other CPU devices. Each GPU 235a-b can be encoded with, interface, or otherwise execute logic, embodied in CP-DP manager 245, to interface with one or more NPUs 225a-b. Indeed, in some instances, CP-DP manager 245 can be implemented within each of GPU 235a-b. The CP-DP manager 245 can be further encoded with logic permitting the CP-DP manager 245 to assist in facilitating, routing, delegation, forwarding, and negotiating communications and data between general-purpose processors 235a-b and network processors 225a-b. For instance, CP-DP manager 245 can decode/encode the data format of messages transmitted between GPUs 235a-b and NPUs 225a-b across PCI, FIFOs, shared memory registers, and other interfaces, and record and maintain state concerning the status of messages sent (e.g., how many messages have been sent, how many responses are due, etc.).

Network element 205 can utilize the NPUs 225a-b to offload handling of portions of some flows from the GPUs 235a-b. A network processor 225a-b can implement a limited set of counting primitives and a number of trigger conditions that can be associated with each flow handled by the network element 205. For instance, if a trigger condition is met for a particular flow, packets for that flow can be dispatched to a GPU (e.g., 235a-b) via in-band communication paths with an appended message (or if no packets are currently flowing via an out-of-band communication path), the message summarizing the counters and conditions of that flow as noted by the NPU 225a-b, as well as trigger conditions that caused the message to be generated. Packets in a data flow can be processed by the GPU 235a-b, for example, for deep-packet processing in connection with billing, policy control, authentication, or other features provided, at least in part, through the network element 205. For instance, the NPU can transfer control of a flow to a GPU 235a-b so it can process portions of a particular data flow to make sure that a given session is being accounted for by the general-purpose processor 235a-b before any important accounting or billing event takes place. Upon accounting for the session, the remainder, or a portion, of the flow can be entrusted solely to the network processor 225a-b for packet counting and forwarding on to other network nodes. If the GPU cannot identify a section of the flow that can be "accelerated" before the end of the data flow, such as a sequence of packets that could be subjected to simplified accounting rules, processing of the packets can include forwarding of all packets in the flow to the general-purpose processor 235a-b and the particular flow session will not be "accelerated," by delegating processing of the flow to the network processor (e.g., 225a-b).

As the complexity and depth of packet processing provided by network processors 225a-b can be more streamlined than high-touch packet handling by the general purpose processors 235a-b, delegating a portion of the flow entirely to such a network processor 225a-b, without processing by the general purpose processor, can serve to "accelerate" this portion of the flow relative to flow portions processed using the general-purpose processor 235a-b. It should be noted, that "acceleration" of a sequence of packets in a data flow speaks more to optimizing processing of flows by a particular network element 205, increasing the efficiency and productivity of network element 205 to allow for the handling of more data flows routed through, or otherwise processed by the network element 205. For instance, by freeing up valuable general purpose processing capabilities of a network element 205 (i.e., provided by general-purpose processors 235a-b) by delegating data flow sequences not requiring the high-level processing capabilities of the general-purpose processors to specialized, streamlined network processors, the processing resources of the network element 205 can be better optimized allowing the network element 205 to handle a larger number of distinct data flows than traditional network elements. In this sense the network element is "accelerating" processing of data flows. Further, in this manner, a network element 205 can realize more intelligent packet processing and functionality using processors (e.g., 235a-b) adapted to provide high-touch handling and deep-packet inspection, while realizing increased efficiency over typical content-aware network elements. Packets in a flow can be selectively processed by general-purpose processors to the extent needed to realize content aware routing, while other portions of the same flow are accelerated using specialized network processors 225a-b adapted to efficiently and quickly perform less complex processing of packets not needing deep-packet inspection or higher-end processing by a general-purpose processor 235a-b.

Figure 3A:
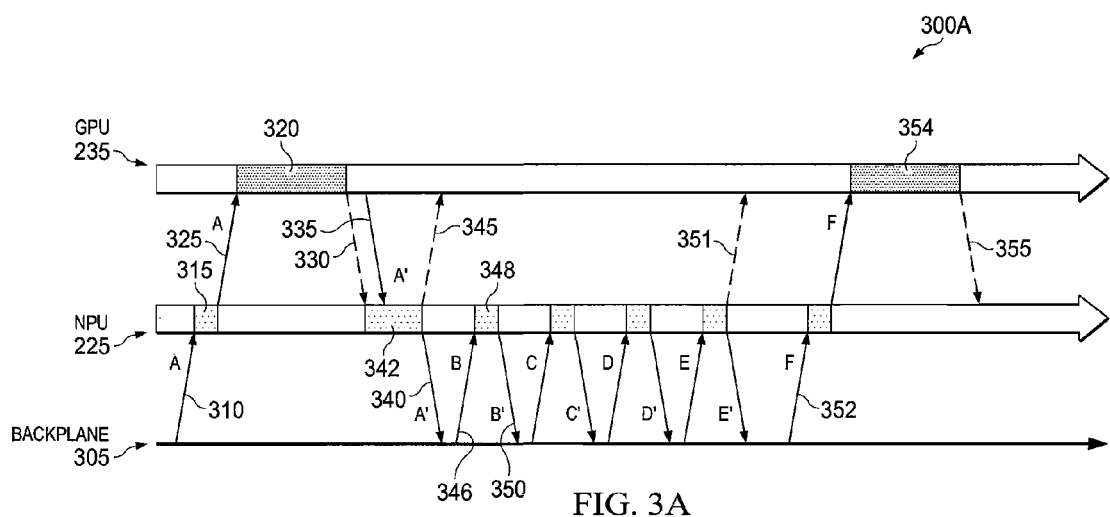
FIGS. 3A-3C are simplified flow diagrams illustrating example interactions within an example communication system.
Figure 3B:
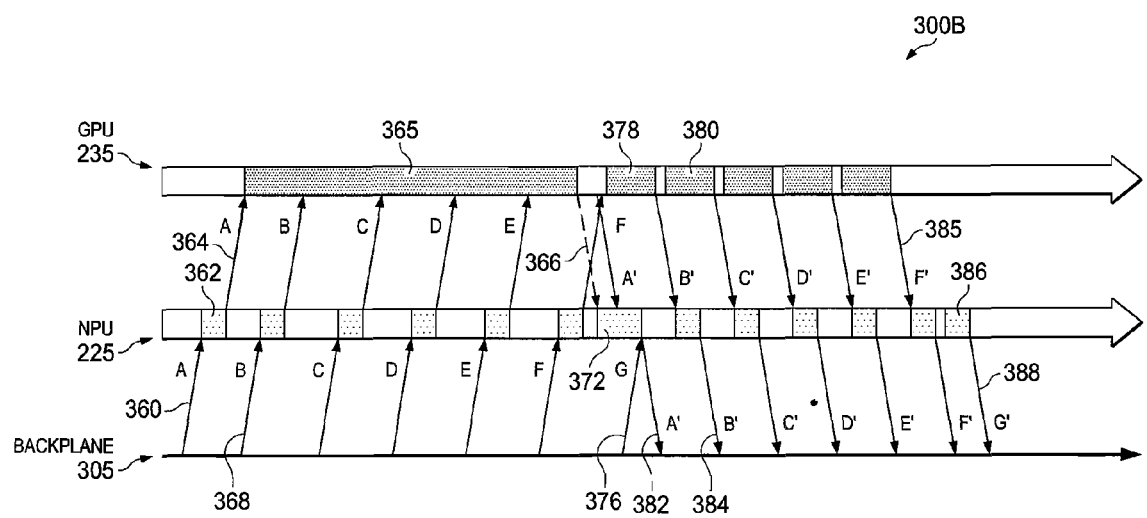
Figure 3C:
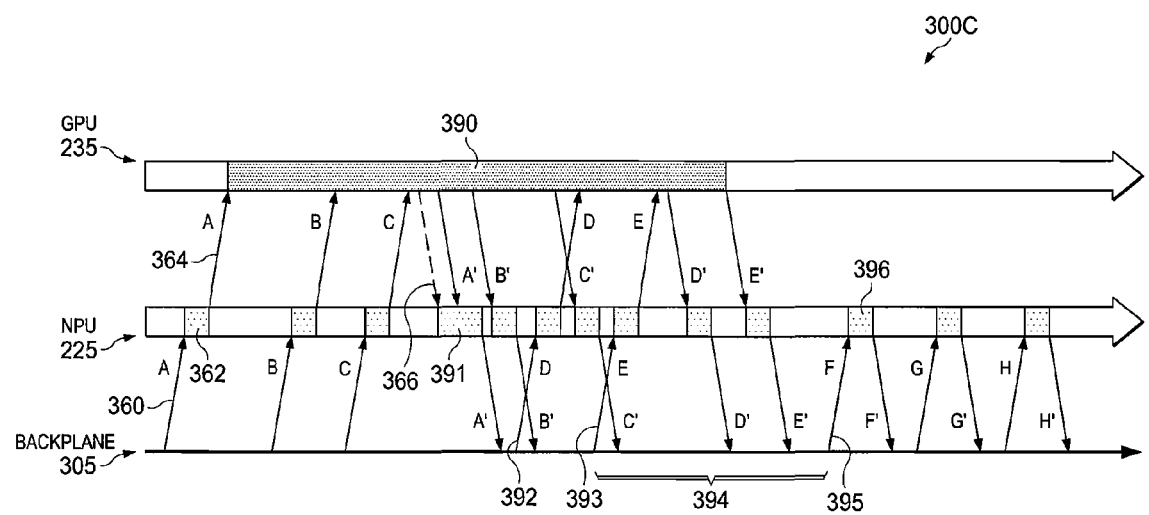

Turning to FIGS. 3A-3C, example signaling diagrams 300a-300c are shown illustrating certain example functionality of a network element configured similar to the network element 205 illustrated and described in connection with FIG. 2. In a first example, a network element including a general-purpose processor unit (GPU) 235 and a network processor unit (NPU) 225 communicate with other network elements or nodes over a network via a backplane 305. A first packet A of a particular data flow is received by the network element. The packets of the data flow can be initially received 310 by the NPU 225. The NPU 225 can be a specialized processor adapted to perform a focused set of operations relating to routing packets of a data flow to remote network elements. The NPU 225 can be "dumb" in the sense that it depends on GPU 235 to provide it instructions for processing packets in a data flow. Accordingly, NPU 225 can perform a basic analysis 315 of packet A to determine whether the packet is associated with a particular data flow and whether particular instructions have been received from the GPU 235 regarding handling of packets in the data flow. In some instances, NPU 225 can process packet A to determine that it is unable to link the packet to a particular data flow (e.g., effectively identifying that packet A is, for example, the first packet received in a particular data flow). In either instance, if NPU 225 is unable to identify instructions for the data flow of packet A, received from GPU 235, NPU 225 can then forward 325 packet A, via an in-band communication channel, to GPU 235 for processing 320. Packets can be so processed 320 by GPU 235, for instance, in order to realize particular service- or content-aware routing functionality or processing. In some instances, the first, or other particular packets in a data flow can be passed 325 to the GPU 235 for processing 320 so as to inspect the packets (e.g., using L7 and/or L4 knowledge and analysis) and determine policies, accounting rules, and other characteristics of the overall data flow, some of which involving the accessing of large tables of data or interacting with external entities. In other instances, delegation of the packet to the GPU 235 can be in response to NPU 225 processing 315 the packet and discovering data that appears to require the more advanced and/or thorough packet processing to which GPU 235 is adapted. The NPU 225 can then forward 325 the packet to the GPU 235 for processing 320.

Further, based on the intelligent processing 320 of one or packets by GPU 235, the GPU can identify opportunities to delegate processing of subsequent sequences of the data flow (i.e., to which Packet A belongs) solely by NPU 225, to realize "accelerated" processing of the data flow. In addition to processing packet A, for instance, to identify acceleration opportunities, processing 320 can also include packet inspection in connection with realizing certain billing, authentication, filtering, policy control, and QoS capabilities of an example network element. Indeed, through the processing 320 of one or more packets, including packet A, GPU 235 can identify certain characteristics of packet A and other packets in the flow stream and determine a protocol for handling subsequent packets in the flow by the network element. For instance, GPU 235 can return instructions, rules, conditions, and/or triggers (e.g., 330) dictating that subsequent sequences of packets received by the network element (e.g., at NPU 225) be handled exclusively by NPU 225 without processing by the GPU 235. This, in turn, can free the GPU 235 to perform high-touch processing of packets in other data flows concurrently handled by the network element.

Instructions 330 generated by the GPU 235 and forwarded to the NPU 225 can indicate that subsequent packets of the data flow be accelerated using the specialized forwarding functionality of the NPU, contingent upon certain conditions or triggers also specified in the instructions 330. In some instances, the GPU 235 can also return 335 the processed packet A' to NPU 225 for forwarding 340 on to the network via the backplane 305, while in other implementations, the GPU 235 can forward the processed packet A' to the backplane 305 directly. In some instances, instructions 330 can be appended to the packet A' returned to the NPU 225, while in other instances, instructions 330 can be communicated out-of-band via control plane messaging or via a direct hardware bus, such as a PCI bus. In either instance, NPU 225 can receive and process 342 the instructions 330 to determine how to handle subsequent packet sequences (e.g., beginning with the next received packet 346) received within the data flow. For instance, NPU 225 can generate a temporary flow record in response to receiving the acceleration instructions 330 from the GPU 235, in order to track progress of incoming packets in the data flow vis-à-vis conditions set forth in the instructions 330 for acceleration of the data flow by the NPU 225, such as the monitoring of the status of certain triggers. Further, in response to parsing 342 the received instructions 330, NPU 225 can send an acknowledgment (ACK) message 345 to the GPU 235 communicating to the GPU 235 that the data flow will be accelerated by the NPU 225 in accordance with instructions 330.

Upon preparing and initializing acceleration of the data flow (e.g., at 342), subsequent packets (e.g., packet B) can be received 346 at the NPU 225 and immediately processed 348 and forwarded 350 on to adjacent network elements via the backplane 305 without involving processing by the GPU 235. Processing 348 of accelerated packets by NPU 225 can include, for example, packet counting and standard routing processing, as well as checks against the fulfillment of a particular acceleration trigger or condition communicated to the NPU 225 by the GPU 235 via the instructions 330. For example, the instructions 330 can specify that packets are to be accelerated over a particular volume of data, through a number of packets, over a particular period of time, until the data flow ends, until a time-out event is detected, until a particular traffic volume limit is reached, until a specific TCP sequence number is detected, until one or more fragmented packets are received, until out of order packet event is detected, etc. For instance, the instructions 330 can specify that packet acceleration should continue only until packets representing a particular volume of data have been accelerated. The instructions can specify further that packets in the data flow should be delegated back to the GPU 235 once the specified condition has been reached, allowing the GPU 235 to revisit whether the acceleration should continue. For example, a particular subscriber can have a monthly limit for the acceleration of particular types of data. The GPU 235 can coordinate with the NPU 225 to ensure that data flows corresponding to the particular subscriber are accelerated according to the subscriber's monthly limit (e.g., ending acceleration when the limit has been reached and approving acceleration when the limit re-sets or has not yet been reached for the period).

The NPU 225 can monitor (e.g., at 348) progress toward the rules, triggers, or conditions of the data flow acceleration as packets are received and coordinate with the GPU 235 to ensure that processing is delegated back to the GPU 235 in accordance with the instructions 330. For example, NPU 225 can transmit one or more messages 351 to GPU 235 indicating progress of the data flow toward a certain condition or to indicate that a trigger or condition has been reached. For instance, NPU 225 can process and forward a packet E and identify that the next packet in the flow (i.e., packet F) should be delegated to the GPU 235 based on conditions communicated in instructions 330. Accordingly, a message 351 can be communicated to GPU 235 indicating that the condition has been satisfied and that packets in the flow will be re-delegated to the GPU 235 for processing. While FIG. 3A illustrates that message 351 is sent in response to the processing of packet E, in some implementations message 351 could alternatively be generated and sent in response to receiving 352 packet F and could even be appended to packet F, by NPU 225, as it is forwarded to GPU 235 for processing. As before, the GPU 235 can inspect and process 354 packet F and generate further instructions 355 for use in potentially accelerating subsequent packets in the data flow. In some instances, instructions 355 can even dictate that the remainder of a particular data flow remain delegated to GPU 235.

A shown in FIG. 3A, in some instances, it can be advantageous to specify parameters for returning control of particular data flow to the GPU 235 in instances where GPU 235 is tasked with performing high-touch or deep packet inspection operations and NPU 225 functions in a "dumb" or streamlined fashion. In some instances, GPU 235 can identify sequences of a particular data flow that can be safely turned over to the "dumb" NPU 225 without involving processing by the GPU 235. Similarly, GPU 235 can also identify the end of such a sequence, or otherwise identify a logical return point for returning control of the flow to the GPU 235. In some cases, if GPU 235 cannot identify a logical or reliable return point within the data flow, GPU 235 can elect not to accelerate the flow at all, in order to maintain control and monitoring of the data flow. To illustrate, FIGS. 4A-4E show an example representations 400a-d of data flows 402a, 402b for processing by a network element including a GPU 235 and NPU 225, that forwards the flow, after processing, to a network 250.

Figure 4A:
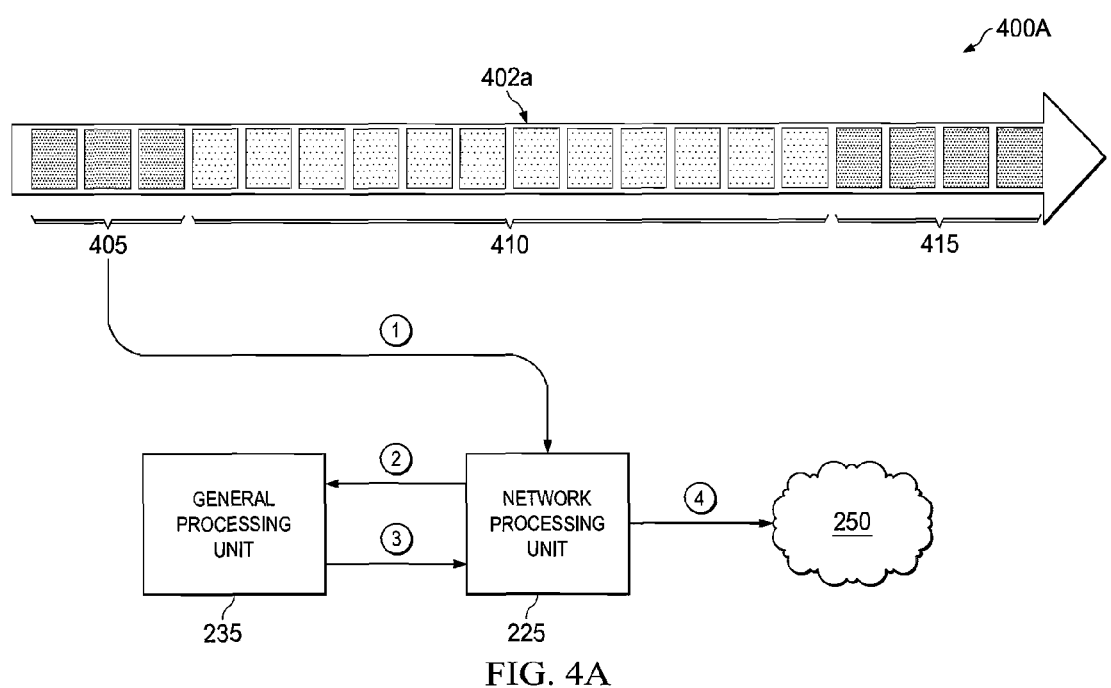
FIG. 4A-4E are simplified diagrams illustrating example interactions within an example communication system.

Turning first to FIG. 4A, a first data flow 402a is received at a network element. A first sequence 405 of packets in the data flow 402a can each be received by NPU 225, the NPU recognizing that no special instructions exist for the flow and forwarding the packets 405 on to the GPU 235 for processing. As detailed above, the GPU 235 can process each of the packets in sequence 405 and identify that a subsequent sequence in the data flow is amenable to acceleration, or streamlined processing using only the NPU 225. The GPU 235 can also identify that there is an end to this sequence, whether actual or theoretical, or a logical return point that justifies ending, at least temporarily, the accelerated processing of the data flow 402a, thereby returning control to the GPU 235. In accordance with identifying an "end" to the sequence, as shown in the representation 400b of FIG. 4B, the GPU 235 can build a set of instructions 418 for the data flow 402a that includes conditions or a trigger (e.g., 420) for returning control of the data flow 402a to the GPU 235 (i.e., corresponding with sequence 415). The GPU 235 can forward these instructions 418 to the NPU 225. Accordingly, upon receiving the next packets following sequence 405, the NPU 225 can now identify that instruction exist for the data flow 402a, the instructions (e.g., 418) specifying that NPU can accelerate processing of packet sequence 410 without further processing by the GPU 235. Consequently, NPU 225 can receive the packets in sequence 410, perform basic routing operations, such as packet counting, time or volume monitoring, etc. and forward the packets in sequence 410 on to network 250.

NPU 225 can perform packet counting, time monitoring, volume monitoring, etc. in connection with accelerated processing of the packet sequence 410 in order to identify when the trigger 420 is met (i.e., when the accelerated packet sequence 410 ends). Turning to the representation 400c of FIG. 4C, upon hitting the trigger 420, packets in flow 402a continue to arrive at NPU 225, but packets received after the trigger (e.g., packet sequence 415) are again forwarded to the GPU 235 for high-touch processing. As in the example of FIG. 4A, GPU 235 processes this packet sequence 415 and returns the packets to NPU 225 for forwarding onto the network 250.

Figure 4B:
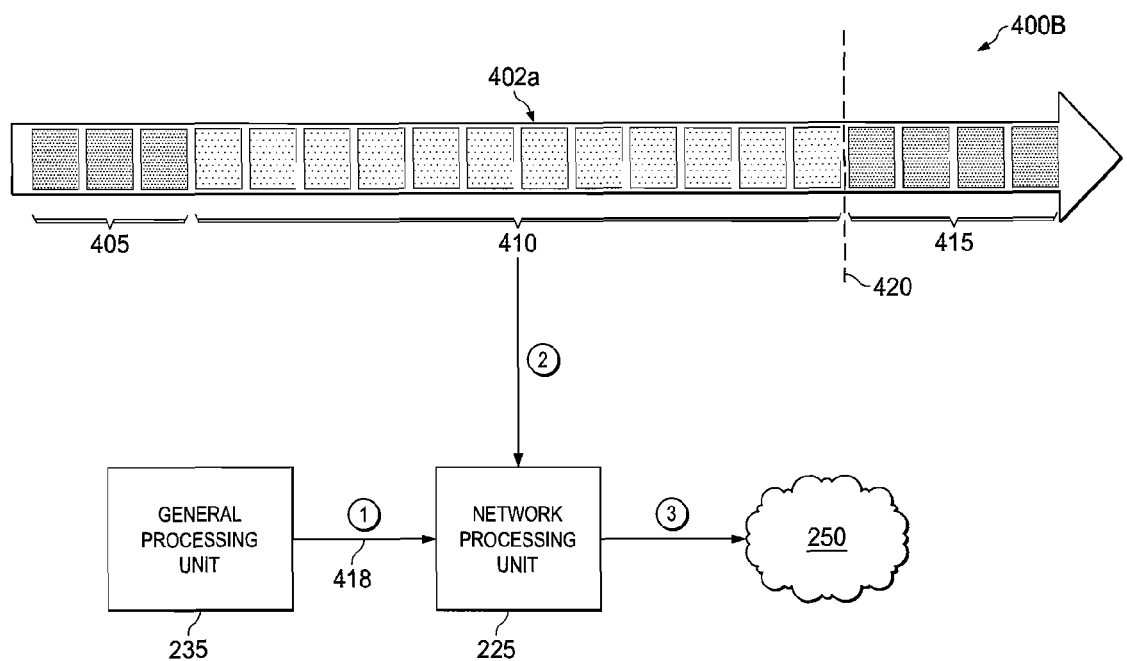
Figure 4C:
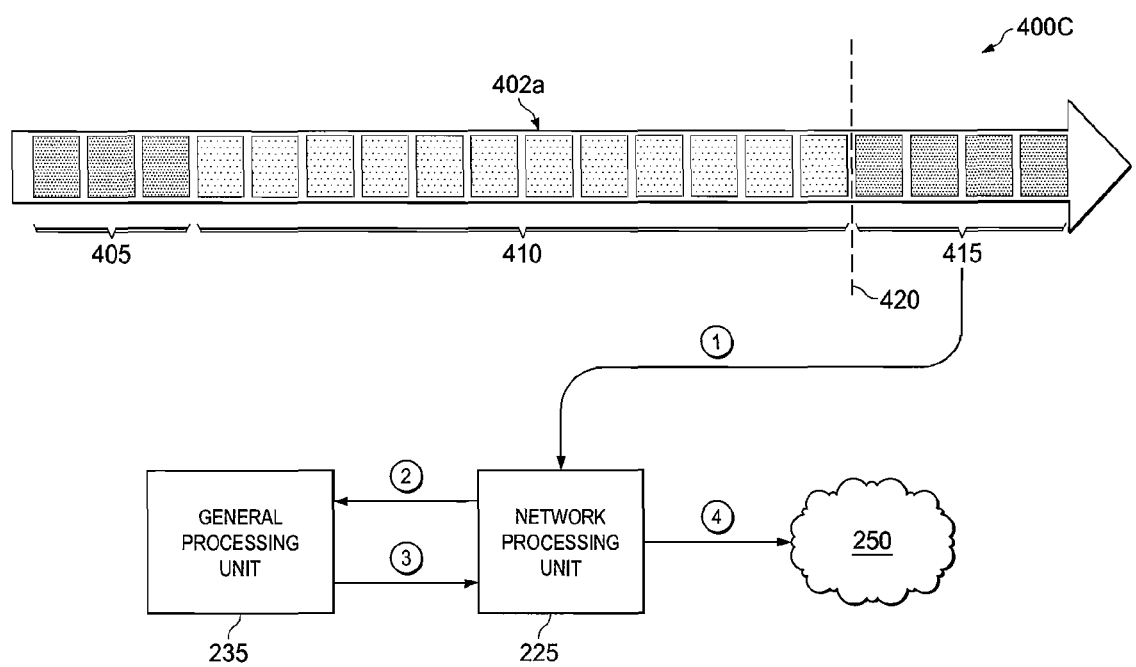
Figure 4D:
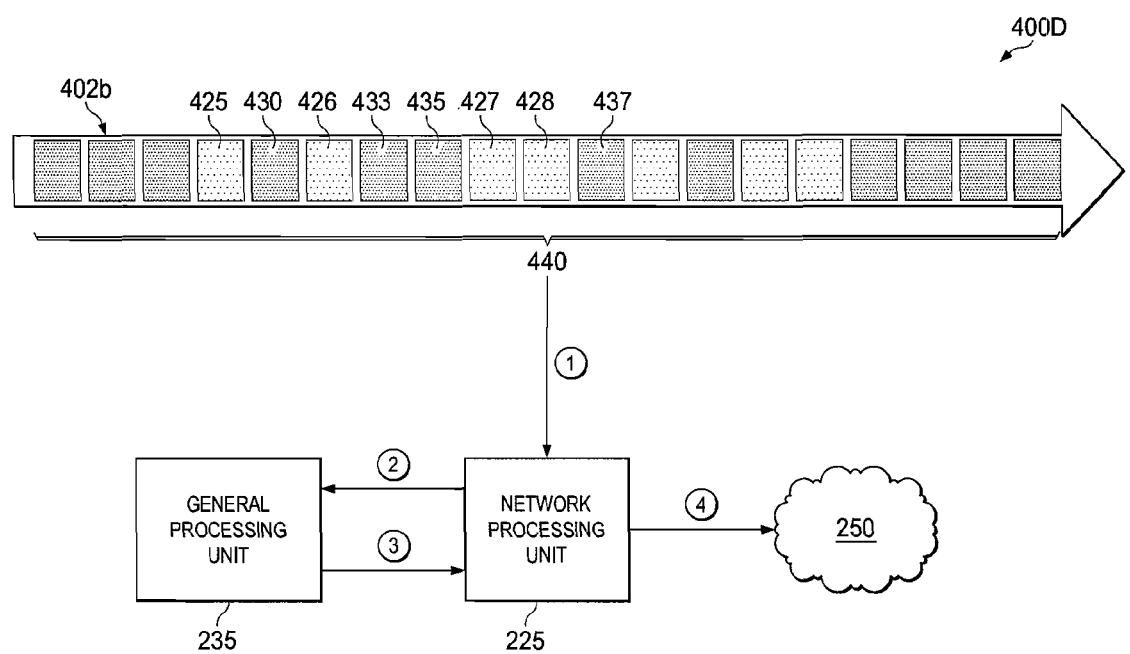

In the example data flow 402a illustrated in FIGS. 4A-4C, a sequence of packets (i.e., 410) was identified that did not require the deep packet processing capabilities of GPU 235, allowing the packet sequence 410 to be accelerated. Turning to the example of FIG. 4D, another data flow 402b is shown that, similar to data flow 402a, also includes packets (e.g., 425, 426, 427, 428) that could be processed solely by NPU (shown in FIG. 4D as lightly shaded rectangles) as well as packets (e.g., 430, 436, 437, 438) that potentially require processing by the GPU 235 (shown in FIG. 4D as darkly shaded rectangles). In the example of FIG. 4D, packets are initially forwarded to GPU 235 from NPU 225, as in the previous example, for processing in order to, among other things, determine whether a subsequent sequence of packets can be passed solely to the NPU 225 for processing.

In both examples, GPU 235 can process some number of packets in a flow to identify chunks of packets (e.g., 410) set to appear later in the flow that could be reliably delegated to the NPU 225 for acceleration. For instance, in one particular example, the GPU 235 can identify from some of the packets that the subsequent payload data of the flow will consist of 10 kilobyte chunks of packet data. Accordingly, the GPU 235 can set a deceleration trigger for the flow that corresponds with the end of the 10 kilobyte chunk and communicate this trigger with acceleration instructions sent to the NPU 225. Based on the received acceleration instructions, the NPU 225 can identify subsequent packets belonging to the flow and accelerate processing of these packets by bypassing processing by the GPU 235. Additionally, the NPU 225 can track the data volume processed since receiving the instructions (or corresponding with the beginning of the 10 kB chunk) to identify when the deceleration trigger has been reached. When the trigger is reached, the NPU 225 can then resume forwarding packets in the flow to the GPU 235 until new instructions are received.

Unlike the example of FIGS. 4A-4C, in the example of FIG. 4D, the GPU 235 processes packets in the flow 402b in an attempt to identify one or more sequences or chunks of packets that can be accelerated using the NPU 225, but is unable to identify such a sequence. As a result, the GPU 235 determines that no portion of the flow 402b can be accelerated. While some small sequences of packets (e.g., 427-428) may indeed exist that could be theoretically accelerated, in this example, GPU 235 can determine that the packets in the flow 402b cannot be reliably accelerated without potentially missing data that should have been more deeply inspected by GPU 235. In other instances, GPU 235 can identify that an opportunity to accelerate a particular subsequent sequence (e.g., 427-428) is too minimal to justify initiating acceleration of the subsequent sequence. In still other examples, the very nature of the data flow itself may not lend to the identification of a closed sequence of packets, as the process of identifying the end of a sequence can be uncertain. For instance, some data flows, such as some L7 protocols, certain progressive video formats where length is provided at the end of the video, mime-encoded data where the length depends on how many different mime-types were provided, certain other protocols that depend on the structure of the message to mark the end of a message rather than providing a length field in the front matter of the message (e.g., some instances of xml when not over http), certain protocols where transactions are seldom longer than a single packet (e.g. WAP (Wireless Application Protocol), Wireless Village, etc.), among other flows or flow types that would require processing of all or most of the flow in order to identify chunks of packets that could be delegated solely to the NPU 225 for processing.

Accordingly, if the GPU 235 determines that it cannot reliably identify and generate instructions (and triggers) corresponding to a close sequence of packets, the GPU 235 can elect to maintain control of the entire data flow, as is shown in FIG. 4D. Indeed, in the example of FIG. 4D, all packets 440 in the data flow 402b are forwarded to the GPU 235 by the NPU 225 for processing and then returned to the NPU 225, from the GPU 235, for forwarding onto the network 250. In other instances, packets processed by the GPU 235 are forwarded to the backplane by the GPU 235, for instance, to avoid loading the NPU 225 with additional exit traffic. In response to analyzing a data flow received at the GPU 235, the GPU 235 can identify and generate deceleration triggers that can be included in flow processing instructions sent to a NPU 225, such as volume limit triggers, duration limit triggers, a greatest allowed TCP sequence number trigger (e.g., for TCP flows in each direction of the flow), a TCP signals mask (e.g., where TCP defines signals such as SYN/FIN/ACK/RST/etc., the GPU can provide a mask of which signals represent trigger events for this flow), a TCP order trigger (e.g., detecting non-contiguous or out-of-order TCP segments), a frag trigger (e.g., if any frag is detected treat it as a trigger event), among other examples.

Figure 4E:
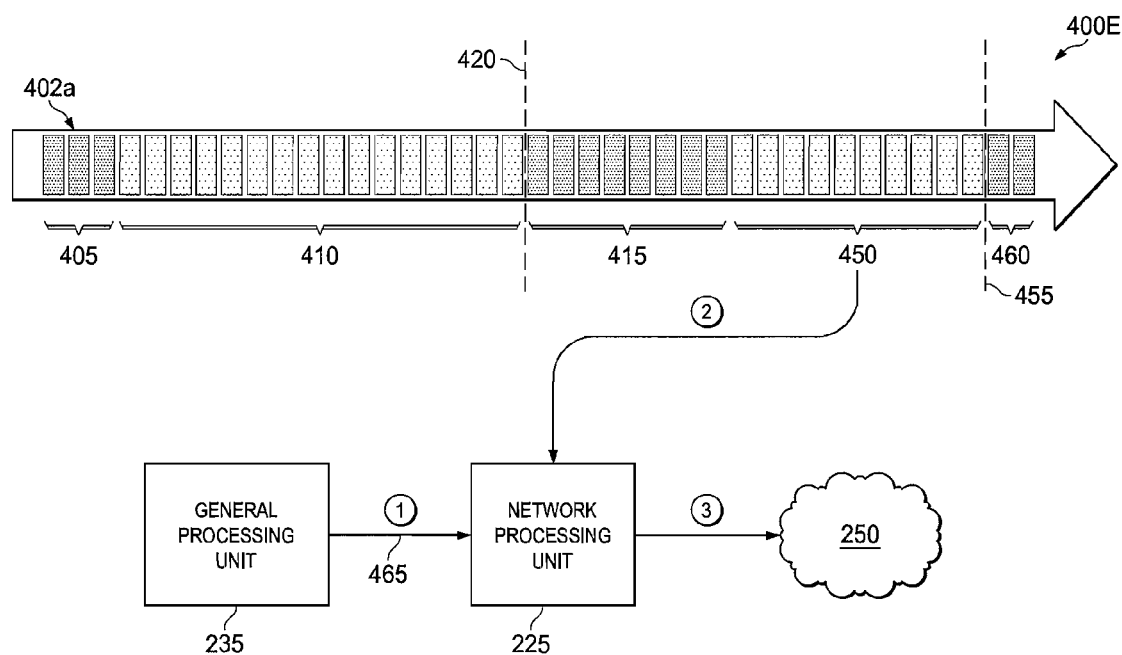

Turning now to FIG. 4E, once a sequence of packets has been accelerated (i.e., using a NPU 225) to the end of an identified sequence, control of the data flow can be returned to the GPU 235, for further deep packet processing. As shown in FIG. 4E, and building upon the particular examples of FIGS. 4A-4C, processing of packets 415 in the data flow 402a by GPU 235, following a deceleration of the data flow 402a in connection with deceleration trigger 420, can result in another sequence 450 of packets being identified, along with a logical endpoint 455 for the sequence, that results in another, subsequent round of acceleration within the data flow 402a (i.e., of sequence 450). Again, acceleration instructions 465 can be sent from the GPU 235 to NPU 225, this time specifying a deceleration trigger or condition corresponding to sequence endpoint 455. NPU 225 can then process packet sequence 450 without the involvement of GPU 235, as in the examples of FIGS. 4A-4C. Upon conclusion of the acceleration of sequence 450, control of the data flow 402a can again be returned to GPU 235, to process still subsequent packets (e.g., sequence 460) in data flow 402a. Indeed, processing of sequence 460 can result in the identification, by GPU 235, of a yet third sequence of packets amenable to acceleration, and so on and so on until the entire data flow has been processed.

As illustrated in the example 400e of FIG. 4E, GPU 235, during deep packet processing of a data flow, can continuously and repeatedly monitor the data flow to identify opportunities to accelerate the flow. As illustrated in FIG. 4D, in some cases, no such opportunity will be identified over the span of a data flow, despite the GPUs 235 continuous efforts to identify a sequence of packets fit for acceleration. In other cases one or more different sequences of packets can be identified within a single data flow, of which, some or all are delegated to NPU 225 for accelerated processing.

Returning to FIGS. 3A-3C, in the example of FIG. 3A, GPU 235 was able to process a packet (i.e., packet A) and return acceleration instructions 330 to the NPU 225 before the next packet in the data flow (i.e., packet B) was received and a decision made regarding whether to forward the packet to GPU 235 or accelerate routing of the packet via the backplane 305. In practice, the exchange between NPU 225 and GPU 235 coordinating acceleration of a data flow may be more complex. For instance, as represented in the example signaling diagram 300b of FIG. 3B, a first packet (i.e., packet A) of another data stream is received 360 and processed 362 by the NPU 225. The NPU 225 can attempt to identify whether the packet belongs to an already-received data flow and further identify whether acceleration instructions exist for that data flow. In the example of FIG. 3B, NPU 225 does not identify acceleration instructions for the data flow and forwards 364 packet A to GPU 235 for handling 365. Unlike the example of FIG. 3A, the GPU 235, in this example, is unable to finish processing 365 the initial packets (e.g., packet A) of the data flow to provide corresponding acceleration conditions, triggers, and instructions (e.g., 366) to NPU 225 before NPU 225 receives 368 additional packets in the flow. For instance, while waiting for instructions from the GPU 235, NPU 225 receives packets B-F. As the NPU 225 does not have instructions and/or authorization for acceleration of these packets, the NPU 225 defaults to forwarding these packets to GPU 235 until instructions (e.g., 366) are received.

Among other considerations, the network element including NPU 225 and GPU 235 can be configured to ensure that the correct packet order is maintained for the data flow. In some instances, with certain data flows, sending packets out of order can be acceptable, and when such instances are identified, packets received by the NPU after the receipt of acceleration instructions can be forwarded onto the backplane by the NPU even before previously-received in-flight packets have been returned from the GPU. In other instances and data flows, where packet order is more important, packet queuing can take place to maintain packet order, such as in the example of FIG. 3B. As shown in the example of FIG. 3B, by the time NPU 225 receives the acceleration instructions 366 generated by the GPU, NPU 225 has also forwarded received packets B-F to GPU 235 for processing. While (or after) processing 372 the received instructions 366 to determine that subsequent packets of the data flow should be accelerated, NPU 225 can receive the first of the subsequent packets (e.g., packet G) prior to receiving packets previously delegated to the GPU and returned by the GPU (e.g., packets B'-F'). In this particular example, were NPU 225 to immediately proceed with acceleration of the data flow by accelerating processing of packet G, packet G would be forwarded on through the backplane before packets B-F, resulting in the packets being disordered. Accordingly, in some instances, NPU 225 can hold packet G in queue until the preceding packets B-F are returned from the GPU 235. This can involve waiting for GPU 235 to process (e.g., 378, 380) and transmit each of packets B-F back to NPU 225 for forwarding through the backplane 305. When the last of the packets delegated to GPU 235 are returned to NPU 225, NPU can then proceed with accelerating packets (e.g., packet G at 386) according to the received instructions 366, forwarding 388 the accelerated packets in order with the previously received packets in the data flow.

As noted in connection with the example of FIG. 3B, acceleration of data flows can be opportunistic in the sense that not all flow portions that match the configured acceleration criteria will necessarily be fully accelerated. For instance, GPU/NPU interaction may need to maintain packet order on the wire. Packet order could be disrupted, for example, if the NPU begins to forward new packets of a flow to the backplane before all packets currently "in flight" to the GPU have themselves reached the backplane. While, in the example of FIG. 3B, packet G (and potentially other subsequent packets not shown) was queued until the last forwarded packet in the flow (i.e., packet F) returned from the GPU before acceleration could commence. However, queuing the flow, in order to delay initiation of acceleration of a packet sequence, can introduce inefficiencies. For instance, rather than dedicating processing resources to streamlined routing operations, a NPU, by queuing frames, can limit its ability to "accelerate" packets for other flows also be handled by the NPU. Indeed, in some instances, a network element including one or more NPUs and one or more GPUs can simultaneously handle hundreds to millions of concurrent data flows, some of which will likely be accelerated at any given time. Consequently, a NPU handling many concurrent flows may end up also queuing frames in each of these flows, leading to processing delays and bottlenecks and handicapping the overall processing capacity of the network element. To avoid this, in other implementations, acceleration can be purely opportunistic in the sense that the NPU only bypasses the GPU to accelerate a packet sequence when both the acceleration instructions have been received by the GPU and the last packet forwarded to the GPU has been returned to the NPU.

FIG. 3C shows an example signaling diagram 300c illustrating an example of purely opportunistic acceleration of a data flow packet sequence. As shown in FIG. 3C, as in the examples of FIGS. 3A and 3B, a packet (i.e., packet A) is received 360, processed 362, and forwarded 364 to GPU 235 by NPU 225 while awaiting acceleration instructions from the GPU 235. As in the example of FIG. 3B, acceleration instructions may be received 366 by the NPU 225 from the GPU 235 after the NPU 225 has forwarded additional packets (i.e., packets B and C) but before the GPU 235 has returned these packets to the NPU 225 for forwarding to the backplane 305. Further, in the example of FIG. 3C, additional packets (e.g., packet D) may be received before packets B and C are returned and after the acceleration instructions have been received 366. In the example of FIG. 3B, packet D would have been queued as NPU 225 awaited the arrival of packet C from GPU 235, so that NPU 225 could accelerate the packet sequence beginning with the first packet received after the receipt of acceleration instructions 366. However, to avoid queuing, in the example of FIG. 3C, while NPU 225 recognizes that acceleration instructions exist for the data flow when it receives 392 packet D, it nonetheless forwards packet D to the GPU 235, recognizing that the last packet of the flow forwarded to the GPU 235 (i.e., packet C) is still being processed 390 by GPU 235. In the example of FIG. 3C, not only does NPU 225 wait to enact the acceleration instructions until packet D is returned from GPU 235, but NPU 225 after forwarding packet D to GPU 235, also receives 393 another packet (i.e., packet E) which it also forwards to GPU 235, further delaying acceleration as the NPU 225 now awaits to have packet D (i.e., the last packet forwarded to GPU 235) returned to it from GPU 235.

With purely opportunistic packet acceleration, NPU 225 waits for a pause between packets in a given data flow so as to ensure that no packets are still being processed by the GPU 235 before commencing acceleration of subsequent packets in accordance with received acceleration instructions 366. In typical data flows, packets are not received according to a set frequency, particularly when packets of multiple data flows are being processed using a single network element or device. Purely opportunistic packet acceleration, therefore, takes advantage of the statistical likelihood of a break developing between packets, after receipt of acceleration instructions, in order to avoid queuing of packets in connection with accelerated packet processing using NPU 225. As shown in FIG. 3C, a break 394 develops within the dataflow between the receipt of packets E and F, providing a window for all of the remaining packets (i.e., packets D and E), previously forwarded to the GPU 235, to be returned to the NPU 225 and forwarded to the backplane 305. Accordingly, upon receiving 395 packet F, NPU 225 can identify that instructions 366 have been received for the flow to which packet F belong and further identify that all previously-received packets in the data flow have returned from the GPU 235 and forwarded to the backplane 305. As a consequence, the network element can exchange control of the flow handling between the GPU 235 and NPU 225 without inadvertently forwarding packets out of sequence. Caring for packet order using opportunistic forwarding can result in failures to accelerate as it is possible that if the gap between packets is consistently smaller than the time it takes a packet to traverse the GPU and return to the NPU, for a given flow, the flow may never actually benefit from an attempt to accelerate it.

Upon identifying that all of the packets have been forwarded to the backplane 305, NPU 225 can commence processing a sequence of packets in the data flow according to the received instructions 366, beginning with packet F. Accordingly, packet F is received 395 but not forwarded to GPU 235 for processing. Instead, NPU 225 processes 396 packet F, for instance, to count the packet or otherwise account for the progress of the data flow (e.g., toward a specified deceleration trigger), and forward the packet onto the network, along with other packets (e.g., packets G and H) in the packet sequence.

It should be appreciated that the representations and examples of FIGS. 3A-3C and 4A-4E are simplified, non-limiting representations of data flows, communications, and operations involving network elements configured to perform opportunistic acceleration of packet sequences. For instance, real world data flows can tend to be much larger (e.g., many more packets) and more complex. Additionally, it should be appreciated that, while FIGS. 3A-3C and 4A-4E include representations of transactions, operations, and interactions performed over a period by various components, the durations of time and data represented are shown in simplified form, for purposes of illustrating certain principles, and should not be interpreted to necessarily correspond to a particular scale or characteristic.

In addition to accounting for packets processed by the NPU in an accelerated sequence, NPU can also perform simple operations on packets forwarded to the GPU for processing, such as counting packets in the data flow. For instance, NPU can begin tracking packet count or volume toward a particular deceleration trigger, including packets that arrive after the acceleration trigger but before acceleration actually commences (similar to packets D and E in the example of FIG. 3C). Additionally, in connection with mitigating sending packets out of sequence, the NPU, according to one particular implementation, can mark packets of a particular flow sequence, that are candidates for acceleration with serial numbers in order to track packet order. The NPU can thereby track the serial number of the last packet sent to the GPU and track which GPU-forwarded packets have reached the backplane. This can be accomplished, for example, by having the GPU egress packets of a candidate flow via the NPU rather than directly (by the GPU) to the backplane. If the NPU sees that the serial number on the returning packet matches the most recent serial number forwarded to the GPU on the flow, it can conclude that all of the GPU-delegated packets have reached the backplane and that there are no more packets "in flight." The next packet to arrive on this flow can then be forwarded directly to the backplane according to acceleration instructions received from the GPU.

Figure 5:
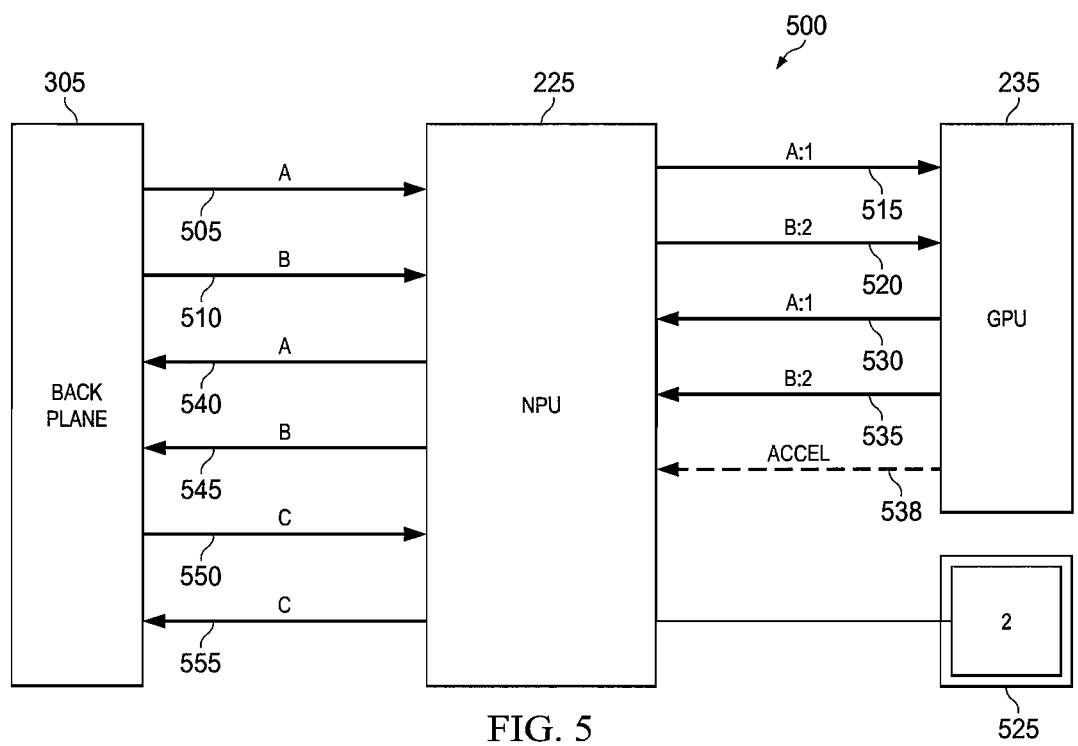
FIG. 5 is a simplified diagram illustrating example interactions within an example communication system.

FIG. 5 is a simplified block diagram illustrating simplified example operations according with the discussion above. For instance, packets A and B are received 505, 510 by a NPU 225 from the backplane 305. The NPU 225 can identify that no instructions have been received from the GPU 235 for the corresponding data flow. Accordingly, NPU 225 can forward the packets A and B to GPU 235 for processing to determine, among other aspects, whether and under what conditions the corresponding data flow can be accelerated. To assist in maintaining ordering of packets in the data flow, NPU 225 can assign serial numbers to packets A and B before forwarding packets A and B to GPU 235 for further processing. For instance, in the simplified example of FIG. 5, NPU 225 can identify that packets A and B are included in the same data flow and assign a serial number "1" to packet A and a serial number "2" to packet B. Further, NPU 225 can append the respective serial numbers to packets A and B and forward the packets, with appended serial numbers, to GPU 235. As NPU 225 assigns each packet in the stream with a respective serial number, NPU 225 can store at least the last-assigned serial number 525 (of the most-recently-received packet in the data flow) to track which packets the NPU 225 is waiting to have returned from the GPU 235 for forwarding onto the backplane.

"Appending" data to a packet can refer to any mechanism that allows data, such as a sequence number (or serial number) value assigned by the NPU 225 or other data, which might be generated by either the NPU 225 or the GPU 235 to be conveyed in association with the packet being delegated to the GPU 235. For instance, a sequence number can be prepended to a packet in a proprietary L2 encapsulation layer that further allows for instructions and triggers passed from the GPU 235 to the NPU 225 by extending the payload length of the packet as described in the proprietary L2 encapsulation and setting a supplemental offset field in the proprietary L2 encapsulation and placing the instructions and triggers in this extended payload section, which the NPU 225 can later strip by fixing up the L2 header before re-encapsulating the packet for the backplane. Additionally, "appending" data can also include pre-pending, inserting, post-pending, or even associating via access to shared memory or registers associated with the packet.

GPU 235 can process packets A and B and return them (530, 535), with corresponding serial numbers still appended, to the NPU 225 along with instructions 538 for accelerating a subsequent sequence of packets in the same data flow. The NPU 225 can identify, from the serial numbers included on the returned packets, whether the last-forwarded packet (i.e., packet B) has been returned from the GPU 235. For instance, NPU 225 can compare the serial number of each returned packet against the stored, last-assigned serial number 525 to identify when packet B (serial number "2") has been returned 535. Additionally, the NPU 225 can then strip the serial numbers from the packets returned from the GPU 235 before forwarding 540, 545 the packets to the network through the backplane 305.

Upon determining that the last-forwarded packet has been returned from the GPU 235 and then forwarded 545 to the backplane, the NPU 225 can then determine that it can commence with acceleration of the data flow based on the acceleration parameters received from the GPU 235. For instance, a packet C can be received 550 after receipt of the acceleration instructions 538 and the forwarding 540, 545 of the previous packets to the backplane 305. The NPU 225, upon receiving 550 packet C, can check that the last-delegated packet B of the data flow has been returned from the GPU 235 (e.g., determined using the stored serial number value, as described above) and commence acceleration of the packet C, processing it and forwarding back 555 through the backplane 305 to the network. If however, packet C had arrived at the NPU 225 prior to the NPU 225 recognizing (from the appended serial number) that packet B had returned from the GPU 235, packet C could be held in queue by the NPU 225 until packet B was returned 535, or alternatively forwarded to the GPU 235 for handling (e.g., if acceleration instructions 538 had not yet been received or if purely opportunistic acceleration is employed).

In some instances, NPU 225 can delay appending serial numbers to data flow packets received from the backplane until it has received acceleration instructions from the GPU for the data flow, rather than appending every received packet with a serial number. While this can result in at least one packet in the flow being forced to pass from the NPU to the GPU and back after the instructions are received, prior to acceleration beginning, overall efficiencies can still be realized by thereby avoiding having the NPU process every packet received from the backplane and appending each packet with a serial number.

Figure 6A:
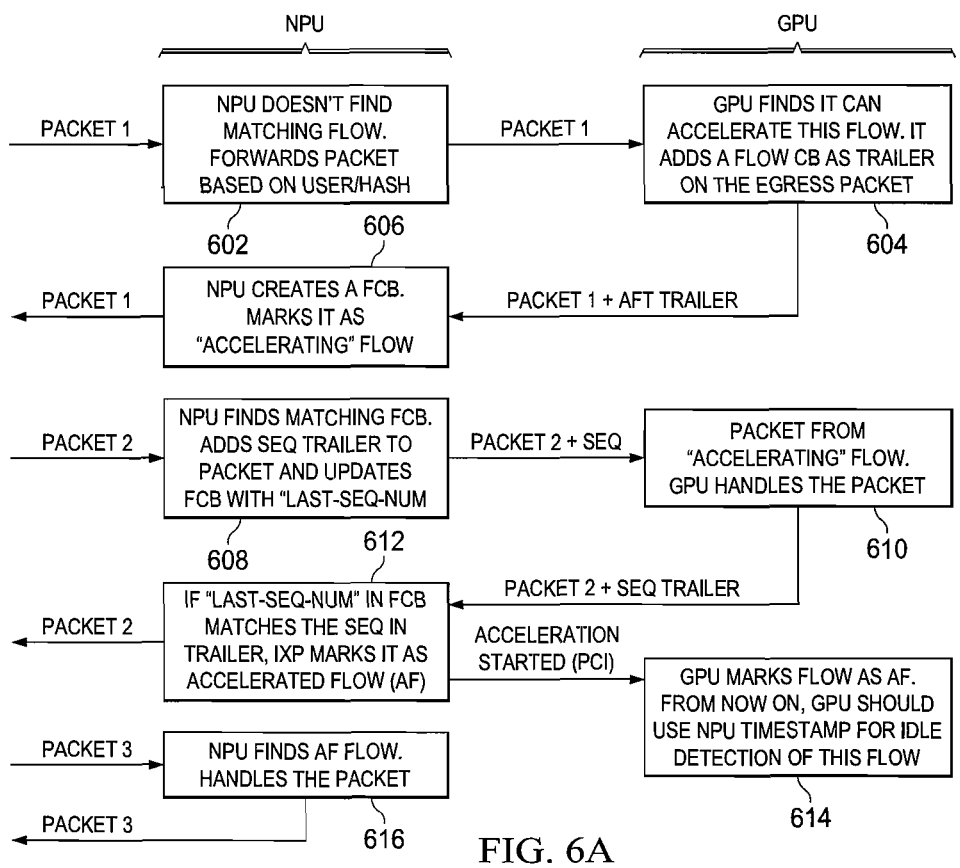
FIGS. 6A-6C are simplified flowcharts illustrating a series of example steps for a providing selective packet acceleration in a network environment.
Figure 6B:
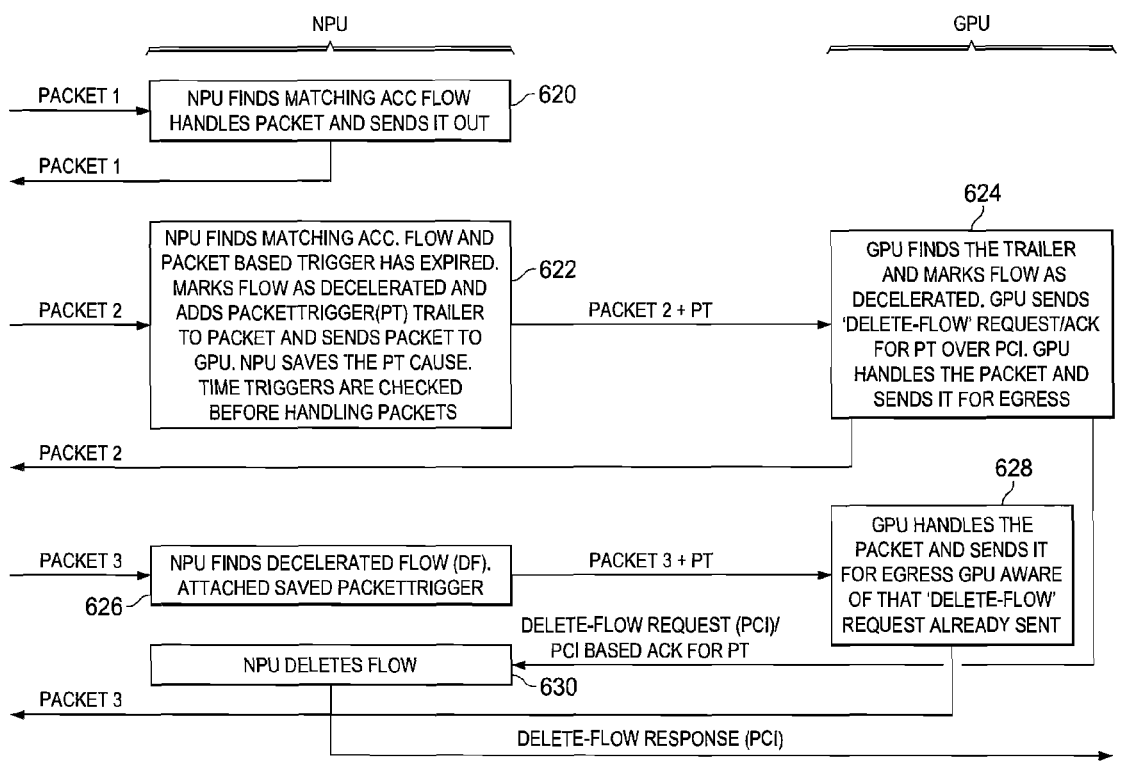

FIGS. 6A-6B are simplified flowcharts showing various example procedures of network elements including at least some of the features described and illustrated above. For instance, FIG. 6A is a flowchart representing certain additional details of negotiating acceleration of a data flow between NPU 225 and GPU 235 incorporating some of the features and principles described above. The NPU can receive a packet and determine 602 that it cannot identify a particular existing data flow with which the incoming packet can be associated. In response to identifying that the packet may not be associated with a current data flow, the NPU can forward the packet to the GPU. The GPU, in connection with, for example, networking software, such as a networking operating system (NOS), can determine 604 whether there is an opportunity to accelerate subsequent packets belonging to an associated data flow. For instance, the GPU can monitor packets received through the NPU to identify trigger conditions for accelerating the flow. The GPU can add trailer data to the packet as it egresses back to the NPU, the trailer communicating characteristics of the packet, its data flow, and routing of packets in the data flow. The NPU can examine the trailer data of the packet and generate 606 a flow control data structure (FCB) for the data flow and mark that the flow is accelerated (AF).

In the particular example of FIG. 6A, a second packet in the data flow can be received by the NPU. The NPU can match 608 the second packet to the data flow of the first packet as well as the flow control data record (FCB) for the flow. This can include appending the second packet with a serial number, tracking the ordering of packets in the flow, and forwarding the packet to the GPU for further processing. Additionally, the serial numbers of the packets in the flow can be maintained in the FCB for the flow. For instance, the last-assigned serial number can be maintained in the FCB to assist the NPU in identifying if packets forwarded to the GPU have been returned to the backplane prior to initiating accelerated forwarding of packets in the flow.

In some instances, tagging packets with serial numbers (by the NPU) can be commenced in response to the receipt of trailer data appended to an earlier packet in the same data flow by the GPU (or NOS). Accordingly, when the GPU receives a subsequent packet in the data flow with an appended serial number, the GPU can identify that the NPU has received the trailer data, including any flow acceleration instructions. In this sense, by tagging subsequent packets with serial numbers and sending these packets to the GPU, a NPU can acknowledge receipt of the trailer and any included acceleration instructions. The GPU can then handle 610 these subsequent packets and return them to the NPU along with the serial number of the second packet, allowing NPU to track which packets have been returned from the GPU. The NPU, upon identifying 612 that the last packet forwarded to the GPU has been returned, can then initiate acceleration of the flow according to the GPU's acceleration instructions. In some instances, the NPU can send a message 614 to the GPU (or NOS) indicating that the flow is accelerated. The GPU (or NOS) can use this acceleration confirmation, for instance, to know to monitor the NPU for time-out's, idle flow, etc. during the accelerated flow (e.g., by monitoring the NPU's time stamp). The following packets in the flow can then be accelerated 616 by the NPU.

Once accelerated routing of a flow has been initiated, it may be desirable to return the flow routing to a "decelerated" state (i.e., involving processing by the GPU). Turning to FIG. 6B, packets can be received and handled 620 by the NPU while the flow is in an accelerated flow state. The NPU can receive another packet and identify 622 that a packet-based trigger has been reached. The trigger can be defined in the acceleration instructions generated by the GPU and can specify that control be returned to the GPU and that the flow be decelerated. Upon identifying that the trigger has been reached, the NPU can forward the received packet to the GPU together with appended trailer data indicating that the flow has been decelerated in accordance with the trigger. In some instances, when a flow is decelerated, the traffic volumes and other statistics for the previously-accelerated flow may need to be made available to the controlling GPU. Current traffic volume values and other statistics can be included in the trailer data appended to the packet and communicated in-band by the NPU. Further, in instances where deceleration is triggered by a timeout or another condition not corresponding to a particular packet, no packet may be available to add a trailer to. In such cases, the NPU can communicate the flow statistics to the GPU via an out-of-band control plane message, such as over a PCI bus communicatively coupling one or more GPUs with one or more NPUs.

In some instances, the GPU can receive the packet and trailer data and identify 624 that the flow has been newly marked as decelerated. The GPU can further send a delete flow request to the NPU, instructing the NPU to dismantle the flow acceleration, for instance, by deleting 630 flow records developed for the accelerated flow. Further, the GPU (and/or NOS) can record that the state of the flow has changed from "accelerated" to "decelerated." Until the NPU receives the delete flow request, the NPU can continue to forward 626 packets in the flow to the GPU for processing 628 with the trailer data indicating that a deceleration trigger has been reached. These subsequent packets with identical trailer data can assist in ensuring that the flow will be decelerated even if the in-band media for passing packets from the NPU to the GPU is only of best-effort quality. Accordingly, the receipt of the delete flow request from the GPU can serve as an acknowledgement message that the GPU received and understood the deceleration trailer data appended to the packet(s) forwarded to the GPU from the NPU following identification 622 of the deceleration trigger.

In one particular implementation, a network element, including a GPU and a NPU, receives an inbound packet. The inbound packet can arrive via the NPU. The NPU can perform a lookup for a flow record corresponding to the data flow of the inbound packet. In the event the NPU does not find an existing flow record for the flow, the NPU can forward the packet to the GPU to inspect the packet and establish parameters of the flow as well as any corresponding billing and enforcement policies. The GPU can receive the packet, begin a session corresponding to the data flow and perform acceleration pre-processing to determine whether an opportunity exists to accelerate subsequent packets in the data flow. Acceleration preprocessing can include searching for trailers or sequence numbers associated with the packet and determining whether the session is in a decelerated or accelerated state. Further, a content definition of the packet can be identified and checked to see if this content is configured for acceleration. If the content definition is configured for acceleration and the data flow is in a decelerated state, it can be determined that the data flow is a candidate for acceleration.

Figure 6C:
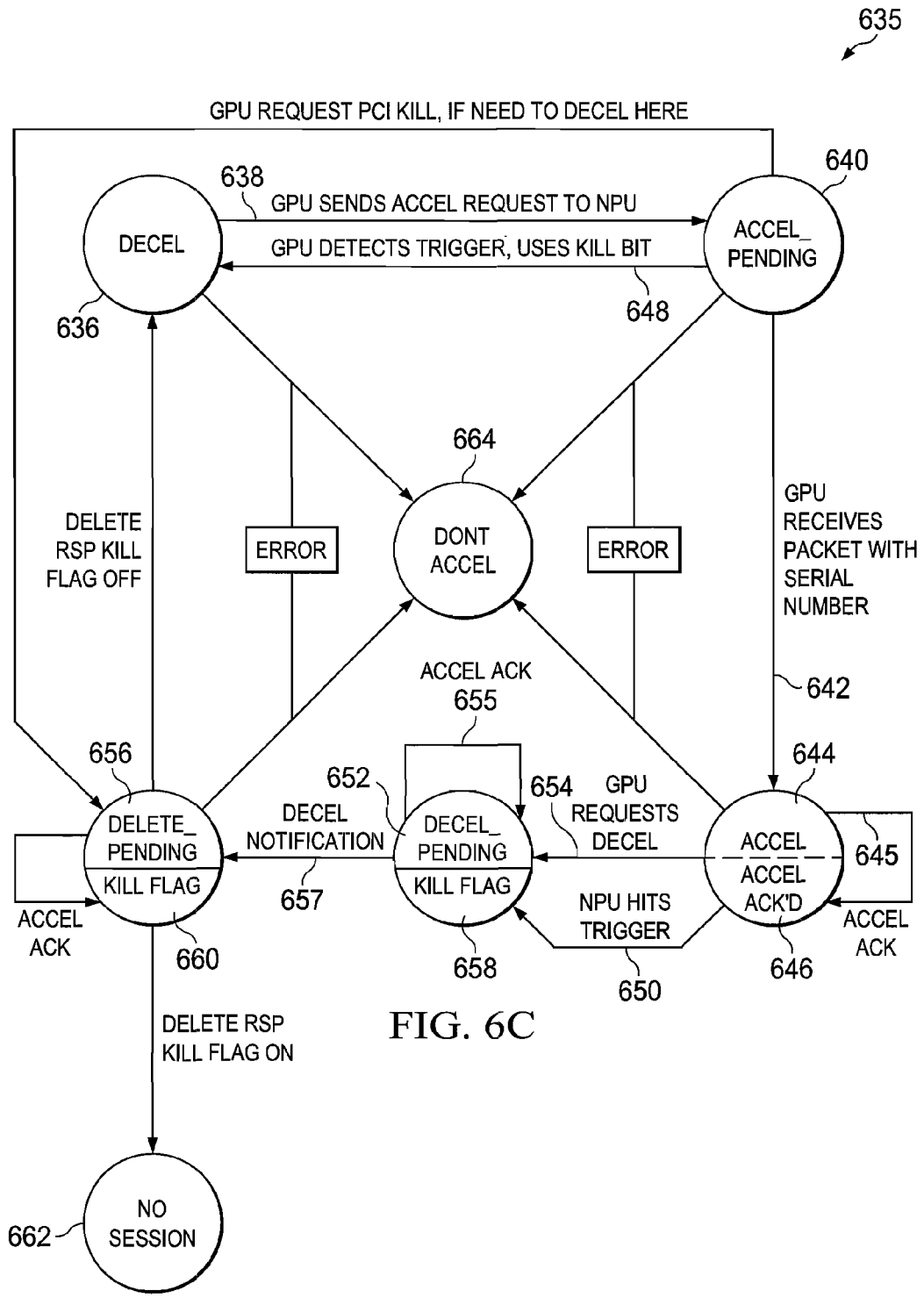

FIG. 6C illustrates a simplified state diagram for one particular implementation of a network element employing an NPU and GPU negotiating acceleration of packet sequences within a particular data flow. In some instances, state of the network element can be maintained by the GPU or software operating in connection with the GPU. Further, it should be appreciated that the state diagram 600 is more representative than formal. For example, while FIG. 6C shows that the Decel_pending and Delete_pending states represent two states each, as indicated by the "Kill flag" annotation, this may not necessarily be the case, as one or more of the described states can be effectively combined into a single state. Also, the events can be considered more descriptive than formal as are any actions. However, it provides an overview of state transitions of at least one particular example, as indicated in more details below.

In some instances, the network element can have a default decelerated ("Decel") state 636 corresponding to a state in which all packets for a flow are being handled on the GPU. This can be the only state from which an acceleration request 638 may be made. Accordingly, the GPU can send an acceleration request 638 to the NPU, upon examining certain preliminary packets, sending the element into an acceleration pending ("Accel_pending") state 640.

The Accel_pending state 640 can indicate that the GPU has sent an acceleration request 638 to the NPU, but does not yet know if the NPU received the request 638. Accordingly, from the Accel_pending state 640, state can transition in a number of ways. For instance, the GPU can receive an acknowledgement 642, from the NPU, that the acceleration request has been received. For instance, the NPU can begin forwarding packets with attached serial numbers (such as described in the example of FIG. 5) in response to the acceleration request, the first serial-number-tagged packet indicating to the GPU that the NPU acknowledges the acceleration request. The receipt of an acknowledgement 642 can transition the state to an accelerated processing (Accel) state 646, bypassing processing by the GPU, similar to that shown and described in the other examples above.

In some examples, the Accel state can be considered a state in which the GPU expects that the NPU may begin directly forwarding packets for this flow to the back plane at any time, and/or may already be doing so. In this state the GPU may receive an Acceleration Ack, out-of-band over a PCI from the NPU confirming that the NPU has begun direct forwarding, but it may not ever get this notification, if the NPU never gets an opportunity for this forwarding (e.g., in purely opportunistic acceleration employing strict packet order maintenance). In instances where such an acknowledgement 645 is received by the GPU indicating that the NPU has begun accelerated processing of the data flow (e.g., after determining that no additional packets are in-flight from the GPU, etc.), the state 640 can transition to an acknowledged acceleration ("Accel ack'd") state 646. Indeed, in some examples, the acceleration state can be thought of as two separate sub-states: Accel 644 and Accel Ack'd 646. For asynchronous interaction, the sub-states can be considered the same, because after transitioning to "Accel," it may be impossible to determine if there is an "ack" in flight.

In some instances, a deceleration trigger specified for a sequence of packets to be accelerated, can be met 648 before the sequence of packets is ever accelerated. For instance, as described in the example of FIG. 3C, opportunistic acceleration can result in some packets in the sequence still being sent to the GPU for processing. In such instances, the trigger count continues to increase and can possibly result in the trigger being met before acceleration ever actually begins. Accordingly, in such instances, the state transitions from Accel_pending 640 to Decel 636. In instances where the packet sequence has been accelerated (e.g., at states 644, 646), hitting a trigger 650 can send the system into a pending deceleration ("Decel_pending") state 652. The Decel_pending state 652 can also indicate that the GPU has sent the NPU a deceleration request 654 or that a deceleration trigger has been hit. This can trigger the sending of deceleration notification 657 transitioning the state to a pending flow record deletion ("Delete_pending") state 656. In some instances, an acceleration acknowledgement 655 can also be received while in state 652, although such an acknowledgement 655 does not transition state.

In some instances, performance of a network element can be further enhanced in instances where a trigger condition is met before the flow is fully accelerated. For example, if the packet that fulfills a particular trigger is marked with a serial number indicating that it was forwarded to the GPU after the NPU had successfully installed an acceleration record based on instructions from the GPU for the corresponding flow, the GPU can then determine that the flow should not be fully accelerated, is not currently fully accelerated, and will not be fully accelerated any sooner than the return of this packet, because this packet carries a serial number and that the NPU should be waiting for this or a later serial number before beginning full acceleration. Having determined this, the GPU can thereby abort the acceleration in a number of ways. It can forward the packet and subsequent packets of the flow directly to the backplane interface, thus defeating the NPUs logic for accelerating the flow. The GPU can also set a flag on the trailer of the flag, notionally referred to as the "kill flag." When this technique is used, the logic on the NPU is set up to look first for the kill flag before doing normal serial number processing on packets passing from the GPU to the NPU. If a "kill flag" is encountered, the logic on the NPU can then simply discard the acceleration record it holds for this flow. Once the record is discarded, subsequent packets on the flow would then not be marked with serial numbers. When the GPU sees a packet on this flow with no serial number, it can treat this as acknowledgement of the "kill bit" indication. This can allow the GPU to transition a flow directly to the Decel state. Typically, any packet arriving at the GPU with a serial number on this flow will be marked with a "kill bit" up until a packet with no serial number is encountered on the flow. This compensates for any loss of transmission between the GPU and the NPU of a packet marked with a "kill bit." A kill bit can serve as an indication, within a packet trailer, that changes the meaning of the message conveyed by the trailer. For instance, a trailer with just a serial number can indicate that full acceleration can commence, if the serial number matches the NPU's highest used serial number on this flow. On the other hand, if the trailer includes a serial number and a kill bit, this can indicate that the NPU is trying to transition to fully accelerated based on this serial number but the GPU is setting a "kill bit" to override this behavior with a request to stop all attempts to accelerate this flow, until further instructions (e.g., new, GPU-generated acceleration requests) are received).

Upon receiving a deceleration request and/or flow record deletion request, state 652 transitions to a pending flow record deletion ("Delete_pending") state 656. The Delete_pending state 656 can indicate that a flow record delete request has been sent to the NPU, requesting that the NPU delete the flow record for the particular accelerated packet sequence flow. Depending on whether a "kill flag" (658, 660) is set, at either the Decel_pending 652 or Delete_pending 656 states, state either transitions back to the original Decel 636 state (when the kill flag is not set) or to a "No session" state 662 (when the kill flag is set). The kill flag can correspond to a "session kill" flag, destroying the current data flow session. The status of the kill flag, in some instances, may not change the life cycle of the acceleration, except that 1) after the flow is fully decelerated, the code will kill the session, and 2) in Decel_pending state 652 with kill and Delete_pending state 656 with kill, packets would be dropped rather than forwarded. In other words, with the kill flag set, GPU expects to destroy the session after it decelerates and deletes the flow record, rather than maintain the session and return it to the original Decel state 636.

Further represented in state diagram 635 is a "Don't Accel" state 664. Don't Accel state 664, in some instances, can be implemented as a flag that stands independent of state, and can be transitioned to from any of the other states (e.g., states 636, 640, 644, 646, 652, 656. When in the Don't Accel state 664, acceleration cannot be performed. For instance, a session can be locked into the Decel state 636 by throwing the Don't Accel state 664 flag for the session. In other instances, errors can cause the Don't Accel state 664 flag to be thrown. In a Don't Accel sub-state, the ability to accelerate may be forbidden for the session, as well as any other state transitions. Such a sub-state can be useful, for example, to stabilize the treatment of flows where signaling between the NPU and the GPU has been disrupted, for example, due to packet loss of non-retried signals. The logic on the GPU and NPU can then coordinate to clean up NPU records that go stale during such an event.

State transitions and status, corresponding to received packets ("Paks") and PCI messages, of one particular example implementation are described in more detail in Table 1:

TABLE 1

| Messages and State Transition | |
|---|---|
| A1) Pak w/serial number \| Decel | Situation: NORMAL RACE This means we have an unexpected acceleration occurring. Normally, this would be induced by a racing decel and accel request, where the decel got there first. OR we hit a trigger condition in Accel_pending, set the kill bit, transitioned to Decel and then the kill bit trailer packet got dropped. So now we need to send another kill bit modify trailer. Next State: Decel Action: Send the kill bit in Flow Modify Trailer, egress via ixp. Scenario: Accel followed by immediate decel request, decel wins, we get ack for decel so we're in decel state, the ixp gets the accel and sends a packet with a serial number. Accel request and Decel ack are racing. |
| A2) Pak w/serial number \| Accel | Situation: NORMAL: This is normal. (just like A3 but we're already in accel) Next State: Accel Action: Normal inspection, policy and control handling, egress through NPU, including Flow Modify Trailer |
| A3) Pak w/serial number \| Accel_pending | Situation: NORMAL This is expected. It means that the accel request arrived and was installed at the NPU. The packet we just received may or may not enable an accel ack over PCI when forwarded. Next State: Accel Action: process packet normally, and assign egress via the NPU that sent it, include Flow Modify Trailer |

TABLE 1-continued

Messages and State Transition

| | |
|---|---|
| A4) Pak w/serial number \| Decel_pending | Situation: NORMAL RACE: This means that the NPU is still trying to short-cut this flow, but the GPU has asked for a deceleration. The last thing we want is for the short cut to activate. We can avoid that by not forwarding this packet via the NPU.<br>Next State: Decel_pending<br>Action: process packet normally, and assign egress via the Hyperion (or data plane). We do not want to use the Kill bit in a trailer, because we are waiting for a decel notification, which will require that the record not be killed before it is processed.<br>Scenario: Accel followed by immediate decel request, decel wins, we get ack for decel so we're in decel state, the NPU gets the accel and sends a packet with a serial number. Different from A1 in that the Pak with sn is racing decel ack |
| A5) Pak w/serial number \| Decel_pending w/kill | Situation: NORMAL RACE: This means that the NPU is still trying to short-cut this flow, but the GPU has asked for a deceleration in order to kill the flow. The last thing we want is for the short cut to activate. We can avoid that by not forwarding this packet via the NPU.<br>Next State: Decel_pending w/kill<br>Action: drop packet<br>Scenario: see A4. |
| A6) Pak w/serial number \| No session | Situation: CANT_HAPPEN:<br>Next State: Don't Accel<br>Action: Set the kill bit in a Flow Modify Trailer, Create flow session in Don't Accel, normal inspection, policy and control, egress via NPU. |
| A7) Pak w/serial number \| Delete_pending | Situation: RACE.<br>Next State: Delete_pending<br>Action: Ignore serial number, handle as in decel, except acceleration is not permitted, if kill flag on flow session is not set, then forward via the hyperion, if kill flag on flow session then drop packet. |
| B1) Pak w/serial number & trigger condition \| Decel | Situation: CANT_HAPPEN: We aren't monitoring for trigger conditions in Decel<br>Next State: Decel<br>Action: See A1 |
| B2) Pak w/serial number & trigger condition \| Accel | Situation: Normal: We monitor for trigger conditions until we get the Accel Ack<br>Next State: Decel<br>Action: Write kill bit on Flow Modify Trailer and forward to NPU. |
| B3) Pak w/serial number & trigger condition \| Accel_pending | Situation: Normal: We monitor for trigger conditions until we get the Accel Ack<br>Next State: Decel<br>Action: Write kill bit on Flow Modify Trailer and forward to NPU. |
| B4) Pak w/serial number & trigger condition \| Decel_pending | Situation: CANT_HAPPEN We're not counting.<br>Next State: Decel Pending<br>Action: See A4 |
| B5) Pak w/serial number & trigger condition \| Decel_pending w/kill | Situation: CANT_HAPPEN - We're not counting<br>Next State: Decel Pending w/kill<br>Action: See A5.<br>Scenario: see A5 |
| B6) Pak w/serial number & trigger condition \| No session found | Situation: Something is out of sync.<br>Next State: Don't Accel<br>Action: See A6 |
| B7) Pak w/serial number & trigger condition \| Delete_pending | Situation: CANT_HAPPEN - not counting.<br>Next State: Delete_pending<br>Action: See A7 |
| C1) Pak w/Decel trailer \| Decel | Situation: UNLIKELY RACE: Indicates a race between a PCI decel return and a trailer decel where the PCI won by so much that the delete has already been processed.<br>Next State: Decel<br>Action: Assuming flow session id matches, treat as redundant and ignore decel trailer. If flow session cookie doesn't match, count error. Let the packet flow through inspection, policy and control normally. |
| C2) Pak w/Decel trailer \| Accel | Situation: NORMAL Indicates that the NPU hit a trigger condition.<br>Next State: Delete_pending<br>Action: Pass the pointer to the trailer to the deceleration function on the flow session. This will update flow session services, protocol handler transactions and send Delete Flow Request to the NPU over PCI. A protocol handler can include logic or code to handle a specific protocol, such as an L7 protocol. Then allow the packet to flow through inspection, policy and control handling normally. Because the flow session is now in Delete_pending, any attempt to accel will not be permitted. |

TABLE 1-continued

| Messages and State Transition | |
|---|---|
| C3) Pak w/Decel trailer \| Accel_pending | Situation: CANT_HAPPEN - NPU doesn't trigger until we've seen at least one packet with serial number, which puts us in Accel.<br>Next State: Don't Accel<br>Action: Count error, ignore trailer, transition to Don't Accel for life of flow session, set kill bit on Modify Flow Trailer. |
| C4) Pak w/Decel trailer \| Decel_pending | Situation: NORMAL RACE: Indicates that the NPU hit a trigger condition after we sent a decel request over PCI but before that request arrived at the NPU and/or before the delete request was processed by the NPU.<br>Next State: Delete_pending<br>Action: Pass the pointer to the trailer to the deceleration function on the flow session. This will update flow session services, protocol handler transactions and send Delete Flow Request to the NPU over PCI. Then allow the packet to flow through inspection, policy and control handling normally. |
| C5) Pak w/Decel trailer \| Decel_pending_kill | Situation: NORMAL Indicates that the NPU hit a trigger condition after we sent a decel request over PCI but before that request arrived at the NPU and/or before the delete request was processed on the NPU.<br>Next State: Delete_pending<br>Action: Ignore packet and drop it. Hand the trailer to the decel function to update stats, send delete request |
| C6) Pak w/Decel trailer \| No Session found | Situation: RARE RACE because we hold the flow session until the "delete flow request" is ack'd by NPU, but if pack with trailer is queued long enough, it is possible.<br>Next State: Don't Accel<br>Action: Create a flow session in Don't Accel (If packet would have created a flow session without trailer), add Flow Modify Trailer with kill bit, let packet go through Inspection, policy and control handling normally. Egress via NPU. |
| C7) Pak w/Decel trailer \| Delete_pending | Situation: NORMAL RACE: The GPU has asked for a decel over PCI and responded or the NPU has triggered an sent a decel notification and the GPU has sent a "delete flow request" to the NPU. Or an error has occurred and the GPU has sent a "delete flow request" to the NPU. While the delete flow request is "in flight" the NPU should put a decel trailer on any packets matching the flow record.<br>Next State: Delete_pending<br>Action: Treat trailer as redundant (ignore except to verify cookie), process packet normally, but do not allow acceleration requests on this flow on this packet. (we never accel in "delete_pending." |
| D1) Pak w/o any extras \| Decel | Situation: NORMAL This is completely normal for a decelerated flow.<br>Next State: Decel<br>Action: Allow to flow through inspection, policy and control handling normally. Egress per PROTOCOL HANDLER decision. |
| D2) Pak w/o any extras \| Accel | Situation: NORMAL - Indicates that the NPU has started short cut forwarding; however, it has a packet that it is sending to the GPU for accounting. Normally, the only reason this will happen is when sequence number triggers are configured on a flow and a packet is out of TCP sequence range. If we have already received the accel ack (recorded a flow handle) and this packet is not an out of range TCP sequence packet, then we have an error and should transition to "don't accel."<br>Next State: Accel<br>Action: Let packet flow through inspection, policy and control handling normally. If the packet is from the past, the protocol handler will have a chance to count it against a former transaction or other counts that cannot be formally mapped to any given know transaction that is currently recorded in memory. If it's from the future, flow session services should hold it as OOO until decel happens. If packet is forwarded, it can go straight to the Hyperion. If we have not received the Accel Ack, we should do pre-accel trigger monitoring as well. |
| D3) Pak w/o any extras \| Accel_pending | Situation: NORMAL RACE This indicates that an accel request has been sent to the NPU, but the NPU has not yet processed it. It is still forwarding packets to the GPU with no flow record installed, or this packet is out of the TCP trigger range. It might also be a TCP packet that is simply out of range for TCP sequence triggers.<br>Next State: Accel_pending<br>Action: Allow to flow through inspection, policy and control handling normally. If not out of TCP range packet, count leaked bytes for update message that will be sent on a trailer of each packet when serial numbers start appearing. Egress via Hyperion. We should also do pre-accel trigger monitoring. |

TABLE 1-continued

Messages and State Transition

| | |
|---|---|
| D4) Pak w/o any extras \| Decel_pending | Situation: RARE RACE - A PCI decel request is in flight, but the response hasn't reached the GPU flow session code. If a packet arrives without any extras, it should be an out of range TCP packet just as in Accel state. Any other packet CANT_HAPPEN because it would either be short-cut or would have a trailer due to trigger condition or to the decel request having arrived.<br>Next State: Decel_pending<br>Action: Allow to flow through inspection, policy and control handling normally. Egress via Hyperion. (If not TCP out of range packet, count error) |
| D5) Pak w/o any extras \| Decel_pending_kill | Situation: RARE RACE - Same as in D4. In other words, this is a packet that is out of TCP sequence as in the Accel. If it were racing a decel response, there would be a decel response here too, because the flow can't be removed until after the flow session moves into Delete_pending. We're going to kill but for all the same reasons as C5, we'll drop for now.<br>Next State: Decel_pending_kill<br>Action: Ignore packet and drop it. |
| D6) Pak w/o any extras \| No session found | Situation: NORMAL. New packet for a new flow session<br>Next State: Decel<br>Action: Create a new flow session in Decel, pass the packet through inspection, policy and control handling normally, egressing per protocol handler decision. (Note protocol handler may transition flow session to accel pending as part of handling.) |
| D7 Pak w/o any extras \| Delete_pending | Situation: NORMAL: Delete should have arrived and been processed. This packet was racing the ack of the delete request.<br>Next State: Delete_pending<br>Action: Process packet through inspection, policy and control handling normally. Note, if kill flag on flow session is set, then we should drop the packet. |
| E1)PCI Decel Notif \| Decel | Situation: CANT_HAPPEN: We can't get to Decel without an ack to a delete flow request. If we got that ack, then there should be no flow record to decel.<br>Next State: Don't Accel<br>Action: Ignore values in decel message, count it, Send Delete Flow Request over PCI. |
| E2) PCI Decel Notif \| Accel | Situation: NORMAL - This should be an async decel notification caused by a time out, or other trigger<br>Next State: Delete_pending<br>Action: Use msg to update flow session service and transaction records, then send Delete Flow Request, and transition flow to decel updating flow session and transaction records and setting idle timer as needed. (May not re-accel until Delete flow record ack is received) |
| E3) PCI Decel Notif \| Accel_pending | Situation: CANT_HAPPEN - so the NPU can't send a PCI Decel Notif until it has transitioned into shortcut mode. So the PCI Accel ack will always arrive before the PCI Decel Notif, which means the state would be Accel. Also, the transition can't happen until at least one packet with serial number has made round trip, which would push flow session into Accel. Things are messed up. Do as in E1.<br>Next State: Don't Accel<br>Action: Ignore values in decel message, count it, Send Delete Flow Request over PCI. |
| E4) PCI Decel Notif \| Decel_pending | Situation: RACE This is a case where the GPU has requested that the NPU decelerate a flow. (Read E2), but on the NPU but a non-packet based trigger has fired simultaneously.<br>Next State: Delete_pending<br>Action: Process the decel notification to catch up the flow session and any transaction data, restart the idle timer if needed. (no egress decision), send delete flow entry request. |
| E5) PCI Decel Notif \| Decel_pending_kill | Situation: NORMAL RACE This is a case where the GPU has requested that the NPU decelerate a flow due to a need to terminate the flow session, but on the NPU a non-packet based trigger has fired simultaneously.<br>IGNORE this event, see C5 logic (make C6 and E6)<br>Next State: Delete_pending<br>Action: decel response into flow session services and transactions and send delete flow message. |
| E6) PCI Decel Notif \| No session found | Situation: CANT_HAPPEN:<br>Next State: No flow session<br>Action: NO ACTION, count |
| E7) PCI Decel Notif \| Delete_pending | Situation: RACE: A delete flow message has been sent due to some error condition and a timeout trigger hit before the delete arrived. There is nothing useful to do.<br>Next State: Delete_pending<br>Action: NONE |

TABLE 1-continued

Messages and State Transition

| | |
|---|---|
| F1) PCI Decel Response \| Decel | Situation: CANT_HAPPEN: closest approx.: we send decel request, we get decel trailer, we send delete request, we go to delete pending and we wait. So the flow session should be in delete pending when a late PCI decel response appears. Since the decel request was sent before the delete request, the decel response should arrive before the delete response, so there was no way to get to decel (unless the decel response is dropped and retried?) Either way, nothing to do.<br>Next State: Decel<br>Action: Ignore or count the msg but do nothing about it. |
| F2) PCI Decel Response \| Accel | Situation: CANT_HAPPEN: when the GPU sends a PCI Decel Request, it moves the flow session into Decel_pending.<br>Next State: Accel<br>Action: Count, ignore |
| F3) PCI Decel Response \| Accel_pending | Situation: CANT_HAPPEN (like F2, except that we would have gone straight to delete_pending if we did this from Accel_pending, so we wouldn't have even sent a decel request)<br>Next State: Accel_pending<br>Action: Count, ignore |
| F4) PCI Decel Response \| Decel_pending | Situation: NORMAL case. GPU sent a PCI decel request and got a rsp.<br>Next State: Delete_pending<br>Action: Process PCI decel response into flow session services and transactions and send delete flow message. |
| F5) PCI Decel Response \| Decel_pending_kill | Situation: NORMAL case. GPU sent a PCI decel request and got a rsp.<br>Next State: Delete_pending<br>Action: decel response into flow session services and transactions and send delete flow message. |
| F6) PCI Decel Response \| No session found | Situation: CANT_HAPPEN: we hold flows in Decel_pending until we get a response<br>Should we take some clean up action?<br>Next State: No flow session<br>Action: count, ignore |
| F7) PCI Decel Response \| Delete_pending | Situation: RACE.<br>Next State: Delete_pending<br>Action: ignore, count, redundant |
| G1) Accel req PCI ack \| Decel | Situation CANT_HAPPEN If we got to Decel pending we start forwarding new packets directly to the Hyperion to avoid this situation, until the "kill flow record request" is processed.<br>Next State: Decel<br>Action: Ignore ack. Count. |
| G2) Accel req PCI ack \| Accel | Situation: NORMAL. We always see a packet with a serial number that transitions the flow session into "accel" before we see a PCI ack. We just need to grab whatever token the NPU sent us and stash it for future use.<br>Next State: Accel, (substate Accel Ack'd because we just got the ack)<br>Action: Stash token on flow session object, disable flow session idle timer |
| G3) Accel req PCI ack \| Accel_pending | Situation: CANT_HAPPEN: We will always see a packet with a serial number that will have moved the flow session to Accel before we see the PCI ack.<br>Next State: Accel_pending?<br>Action: Ignore ack and count? |
| G4) Accel req PCI ack \| Decel_pending | Situation: RACE NORMAL: The opportunity packet was forwarded, then the GPU sent an async decel, moving the flow session into decel_pending, the accel ack and the decel request/response are racing.<br>Next State: Decel_pending<br>Action: Stash the IP ID and otherwise ignore. |
| G5) Accel req PCI ack \| Decel_pending_kill | Situation: RACE NORMAL: The opportunity packet was forwarded, then the GPU sent an async decel, moving the flow session into decel_pending, the accel ack and the decel request/response are racing.<br>Next State: Decel_pending_kill<br>Action: Stash the IP ID and otherwise ignore. |
| G6) Accel req PCI ack \| No session found | Situation: CANT_HAPPEN: By the time the flow session is gone, the delete flow request will have been ack'd. If it has been ack'd then there is no accel record. So the accel ack had to be sent before the delete ack, so if ordering is respected across PCI, then this just can't happen.<br>Next State: No flow session.<br>Action: count |

TABLE 1-continued

Messages and State Transition

| | |
|---|---|
| G7) Accel req PCI ack \| Delete_pending | Situation: RARE RACE, see G6 for explanation. Another example, accel a tcp flow with ooo trigger, first packet w/serial number moves us to Accel and provides NPU with opportunity. NPU sends accel ack over PCI, but it gets held in queues due to lots of interrupt scheduling. The very next packet - the first to be short cut - hits the OOO trigger because it is out of order. So the NPU sends it to GPU with decel trailer. GPU processes it and jumps straight to "delete_pending," then process gets context and the ack is delivered.<br>Next State: Delete_pending<br>Action: Ignore, count, Stash IP ID. |
| H1) Accel req PCI nak \| Decel | Situation: CANT_HAPPEN<br>Next State: Don't Accel, Set never accel flag<br>Action: count |
| H2) Accel req PCI nak \| Accel | Situation: CANT_HAPPEN<br>Next State: Don't Accel, Set never accel flag<br>Action: count |
| H3) Accel req PCI nak \| Accel_pending | Situation: NORMAL: if no room on NPU<br>Next State: Don't Accel, Set never accel flag<br>Action: count |
| H4) Accel req PCI nak \| Decel_pending | Situation: NORMAL: same as H3<br>Next State: Don't Accel, Set never accel flag<br>Action: count |
| H5) Accel req PCI nak \| Decel_pending_kill | Situation: NORMAL: same as H3<br>Next State: Don't Accel, Set never accel flag<br>Action: count |
| H6) Accel req PCI nak \| No session found | Situation: CANT_HAPPEN, ignore<br>Next State:<br>Action: count |
| H7) Accel req PCI nak \| Delete_pending | Situation: NORMAL: same as H3<br>Next State: Don't Accel<br>Action: count |
| I1) Decel req PCI nak \| Decel | Situation: CANT_HAPPEN Error - response in all cases should be to go to decel if the reason for the nak is "no flow record found." If there is a flow record, then a delete should be sent and next state should be "Don't Accelerate"<br>Next State: Decel<br>Action: NONE, unless kill flag set on flow session, then do kill processing. |
| I2) Decel req PCI nak \| Accel | Situation: CANT_HAPPEN Error - response in all cases should be to go to decel if the reason for the nak is "no flow record found." If there is a flow record, then a delete should be sent and next state should be "Don't Accelerate"<br>Next State: Decel<br>Action: NONE, unless kill flag set on flow session, then do kill processing. |
| I3) Decel req PCI nak \| Accel_pending | Situation: CANT_HAPPEN Error - response in all cases should be to go to decel if the reason for the nak is "no flow record found." If there is a flow record, then a delete should be sent and next state should be "Don't Accelerate"<br>Next State: Decel<br>Action: NONE, unless kill flag set on flow session, then do kill processing. |
| I4) Decel req PCI nak \| Decel_pending | Situation: CANT_HAPPEN Error - response in all cases should be to go to decel if the reason for the nak is "no flow record found." If there is a flow record, then a delete should be sent and next state should be "Don't Accelerate"<br>Next State: Decel<br>Action: NONE, unless kill flag set on flow session, then do kill processing. |
| I5) Decel req PCI nak \| Decel_pending_kill | Situation: CANT_HAPPEN Error - response in all cases should be to go to decel if the reason for the nak is "no flow record found." If there is a flow record, then a delete should be sent and next state should be "Don't Accelerate"<br>Next State: Decel<br>Action: NONE, unless kill flag set on flow session, then do kill processing. |
| I6) Decel req PCI nak \| No session found | Situation: CANT_HAPPEN Error - response in all cases should be to go to decel if the reason for the nak is "no flow record found." If there is a flow record, then a delete should be sent and next state should be "Don't Accelerate"<br>Next State: Decel<br>Action: NONE, unless kill flag set on flow session, then do kill processing. |

TABLE 1-continued

Messages and State Transition

| | |
|---|---|
| I7) Decel req PCI nak \| Delete_pending | Situation: CANT_HAPPEN Error - response in all cases should be to go to decel if the reason for the nak is "no flow record found." If there is a flow record, then a delete should be sent and next state should be "Don't Accelerate"<br>Next State: Decel<br>Action: NONE, unless kill flag set on flow session, then do kill processing. |
| K1) PCI Delete Flow ack \| Decel | Situation: CANT_HAPPEN<br>Next State: Decel<br>Action: Count |
| K2) PCI Delete Flow ack \| Accel | Situation: CANT_HAPPEN<br>Next State: Accel<br>Action: Count |
| K3) PCI Delete Flow ack \| Accel_pending | Situation: CANT_HAPPEN<br>Next State: Don't Accel<br>Action: Count |
| K4) PCI Delete Flow ack \| Decel_pending | Situation: CANT_HAPPEN<br>Next State: Decel_pending<br>Action: Count |
| K5) PCI Delete Flow ack \| Decel_pending_kill | Situation: CANT_HAPPEN<br>Nest State: Decel_pending_kill<br>Action: Count |
| K6) PCI Delete Flow ack \| No session found | Situation: CANT_HAPPEN<br>Next State: No flow session<br>Action: Count |
| K7) PCI Delete Flow ack \| Delete_pending | Situation: NORMAL<br>Next State: Decel<br>Action: Transition to Decel, if kill bit is set, then need to destroy flow session. |
| L1) PCI Delete Flow nak \| Decel | Situation: CANT_HAPPEN<br>Next State: Decel<br>Action: Count |
| L2) PCI Delete Flow nak \| Accel | Situation: CANT_HAPPEN<br>Next State: Accel<br>Action: Count |
| L3) PCI Delete Flow nak \| Accel_pending | Situation: CANT_HAPPEN<br>Next State: Accel_pending<br>Action: Count |
| L4) PCI Delete Flow nak \| Decel_pending | Situation: CANT_HAPPEN<br>Next State: Decel_pending<br>Action: Count |
| L5) PCI Delete Flow nak \| Decel_pending_kill | Situation: CANT_HAPPEN<br>Nest State: Decel_pending_kill<br>Action: Count |
| L6) PCI Delete Flow nak \| No session found | Situation: CANT_HAPPEN (Unexpected error is there anything useful to do here?)<br>Next State: No flow session<br>Action: Count |
| L7) PCI Delete Flow nak \| Delete_pending | Situation: NORMAL Error, is there anything useful we can do for this?<br>Next State: Don't Accel<br>Action: Count, if kill bit is set on flow session, then destroy flow session. |
| Cells M1-7, N1-7, O1-7 and P1-7 represent constraints on the states in which the application is meant to take certain actions. WONT_HAPPEN means that the implementation is not expected to ever execute this action in this state. | |
| M1) Delete Flow Request \| Decel | Situation: WONT_HAPPEN or ERROR_RECOVERY E1<br>Next State: Don't Accel<br>Action: Send Delete Flow Request |
| M2) Delete Flow Request \| Accel | Situation: Normal - If we get an autonomous decel notification from the NPU or a pre-accel monitoring trigger fires, we generate a delete flow request directly out of accel (good example would be idle timer)<br>Next State: Delete_pending<br>Action: Send Delete Flow Request. |
| M3) Delete Flow Request \| Accel_pending | Situation: Normal - If we get an autonomous decel notification from the NPU or a pre-accel monitoring trigger fires, we generate a delete flow request directly out of accel_pending (good example would be idle timer)<br>Next State: Delete_pending<br>Action: Send Delete Flow Request. |
| M4) Delete Flow Request \| Decel_pending | Situation: NORMAL - We get the decel response and send the delete<br>Next State: Delete_pending<br>Action: Send Delete Flow Message. |

TABLE 1-continued

Messages and State Transition

| | |
|---|---|
| M5) Delete Flow Request \| Decel_pending_kill | Situation: NORMAL - We get the decel response and send the delete<br>Next State: Delete_pending<br>Action: Send Delete Flow Message. |
| M6) Delete Flow Request \| No session found | Situation: CANT_HAPPEN<br>Next State: no flow session<br>Action: NONE. |
| M7) Delete Flow Request \| Delete_pending | Situation: WONT_HAPPEN.<br>Next State: Delete_pending<br>Action: NONE |
| N1) Session Idle Timer \| Decel | Situation: NORMAL<br>Next State: Decel<br>Action: Idle function |
| N2) Session Idle Timer \| Accel | Situation: NORMAL - if opportunity didn't arrive in time, so the idle timer is still running, which means we didn't ever get an accel ack. The question is: Can we use the length of the idle timer to suppose that an ack was never generated? The logic is that possibly the last packet through created the opportunity that led to generating the accel ack, but the ack isn't here yet. Seems preposterous, so rather than go through decel processing, we just do a delete.<br>Next State: Delete_pending<br>Action: Send PCI Delete flow request |
| N3) Session Idle Timer \| Accel_pending | Situation: NORMAL - We tried to accel on the last packet of the flow, since no more packets arrived, now our idle time popped.<br>Next State: Delete_pending<br>Action: Send PCI delete flow request. |
| N4) Session Idle Timer \| Decel_pending | Situation: WONT_HAPPEN, we don't have an idle timer running once we send decel request.<br>Next State: Decel_pending<br>Action: NONE |
| N5) Session Idle Timer \| Decel_pending_kill | Situation: WONT_HAPPEN, we don't have an idle timer running once we send decel request.<br>Next State: Decel_pending_kill<br>Action: NONE |
| N6) Session Idle Timer \| No session found | Situation: WONT_HAPPEN, we don't have an idle timer running if there's no flow session.<br>Next State: no flow session<br>Action: NONE |
| N7) Session Idle Timer \| Delete_pending | Situation: WONT_HAPPEN, we don't have an idle timer running once we send delete request.<br>Next State: Delete_pending<br>Action: NONE |
| O1) Accel Request \| Decel | Situation: NORMAL<br>Next State: Accel_pending<br>Action: Create an Accel trailer on packet, indicate destination NPU. |
| O2) Accel Request \| Accel | Situation: WONT_HAPPEN - There is already a record in the NPU.<br>Next State: Accel<br>Action: NONE |
| O3) Accel Request \| Accel_pending | Situation: WONT_HAPPEN - We've already sent one (we may someday try again, but not in R5 phase 1)<br>Next State: Accel_pending<br>Action: Accel_pending |
| O4) Accel Request \| Decel_pending | Situation: WONT_HAPPEN - we only accel from Decel<br>Next State: Decel_pending<br>Action: NONE |
| O5) Accel Request \| Decel_pending_kill | Situation: WONT_HAPPEN - we only accel from Decel<br>Next State: Decel_pending<br>Action: NONE |
| O6) Accel Request \| No session found | Situation: WONT_HAPPEN - what would we be accelerating?<br>Next State: none<br>Action: NONE |
| O7) Accel Request \| Delete_pending | Situation: WONT_HAPPEN - we only accel from Decel<br>Next State: Decel_pending<br>Action: NONE |
| P1) Decel Request \| Decel | Situation: WONT_HAPPEN<br>Next State: Decel<br>Action: NONE |
| P2) Deccel Request \| Accel | Situation: NORMAL<br>Next State: Decel_pending<br>Action: Send PCI Decel Request (we don't know if the NPU might be racing into accelerated state due to the opportunity provided by the very packet that transitioned us into Accel, so we have to use the decel sequence) |

TABLE 1-continued

Messages and State Transition

| | |
|---|---|
| P3) Decel Request \| Accel_pending | Situation: NORMAL - some async control event requires decel<br>Next State: Delete_pending<br>Action: Send PCI delete request (we can do this because there has never been an "opportunity packet." |
| P4) Decel Request \| Decel_pending | Situation: WONT_HAPPEN - we already sent request. We're waiting for response.<br>Next State: Decel_pending<br>Action: NONE |
| P5) Decel Request \| Decel_pending_kill | Situation: WONT_HAPPEN - We already sent a successful request, we're waiting for response.<br>Nest State: Decel_pending_kill<br>Action: NONE |
| P6) Decel Request \| No session found | Situation: CANT_HAPPEN - We don't have a reason to decel a non-existent flow session (we might kill but not decel)<br>Next State: no flow session<br>Action: NONE |
| P7) Decel Request \| Delete_pending | Situation: WONT_HAPPEN - we had to get s decel response to get to delete_pending.<br>Next State: Delete_pending<br>Action: NONE |

Further, in certain implementations, various software modules, tools, and functions can be provided in connection with a GPU for use in preprocessing a data flow, determining whether the data flow is a candidate for acceleration, and configuring an accelerated flow state. For instance, a demultiplexer module can be provided to invoke normal session services/protocol handler code, or other logic or software modules (e.g., for L4-L7 handling) to process inbound packet. A check_acceleration( ) function can be called to check the state of the session to see if this session can be accelerated. A get_trigger( ) function can be called which allocates storage for an acceleration data object corresponding to an accelerated session. The get_trigger( ) function can further fill a trigger block of the acceleration object with corresponding acceleration rules, conditions, and trigger values. For instance, the get_trigger( ) function can calculate triggers for a particular flow, including, as examples, building a buffer into the trigger to ensure that packets are decelerated in advance of a particular event corresponding to the trigger, implementing and following pre-defined parameters for an acceleration, such as minimum and/or maximum thresholds for the flow acceleration, among other considerations and criteria. Further, a start_session( ) function can be invoked to call a platform API to retrieve a header to append to the packet. The start_session( ) function can fill-in the information in the header in connection with an acceleration request/authorization communicated to the NPU. The header can include the trigger values and other rules and conditions for the acceleration. The start_session( ) function can further change the session state to "acceleration pending," pending acceptance of the NPU. Further, during pre-acceleration processing, until an accelerated session is handed-off to the NPU, the GPU and related modules can be responsible for monitoring triggers for the flow (e.g., where multiple packets are received in the flow prior to the acceleration request being accepted by the NPU).

Once the NPU receives the acceleration request from the GPU (as appended to the header of the first packet returned from the GPU), the NPU can create a flow record for the flow. A subsequent inbound packet can be received by the NPU for the flow. Before taking complete ownership of the flow, the NPU can check to see that each proceeding packet in the flow made round trip through the network element and out to the backplane. The NPU can tag the packet with a serial number and forward the tagged packet to the GPU. The demultiplexer module can identify the packet and invoke acceleration pre-processing. If the session state is "acceleration pending" the receipt of a packet with an appended serial number can act as an ACK message and the session state is transitioned to "accelerated." Further, in response to receiving the ACK message, a PCI handler can create a session key based on the information in the ACK and invokes a session callback routine ack_accel( ) to find the session block, sees the session is in "accelerated" state and that the response was a successful ACK. The ack_accel( ) function can further set a ACK_ACCEL flag in the session block indicating that full acceleration is on and disabling the idle timer for the session and performing other activities to transition the GPUs record of the flow as needed for an accelerated flow. In acceleration, the NPU can continue to receive and forward packets directly, maintaining byte counts in the flow record and watching for trigger hits that can initiate a deceleration hand-off from the NPU to the GPU.

Selectively accelerating data flows allows for the provision of a network gateway system equipped with service-aware processing functionality (e.g., using one or more GPUs) to provide a number of accounting, billing, policy control, and enforcement features. Some of these accounting and enforcement features, however, may involve monitoring a plurality of data flows associated with a particular subscriber over a particular period. For instance, certain accounting, billing, or policy control features may apply to session states as observed across an aggregate of sessions for a particular user. Accordingly, opportunities to accelerate data flows related to the processing of such high-level features may be limited, in part, based on other data flows in the plurality of data flows, or aggregate of sessions.

By way of example, a particular user may subscribe to a service subject to a billing or enforcement policy that involves periodic deep-packet processing of packets of a particular type of traffic, for instance, to grant permission for access to the particular service (e.g., in connection with monitoring a subscriber's monthly data limit for a particular traffic type), or to prompt a billing event in connection with a data traffic threshold being met corresponding to a particular billing event, etc. Accordingly, when such a limit is approached or reached, control over data flows relevant to the corresponding billing or enforcement policy may need to be returned to a GPU for higher-level processing. In instances where an aggregate of distinct data flows are relevant to a particular billing or enforcement policy, one or more of the data flows may be accelerated, in accordance with the features described above. Additionally, as with single flow acceleration, packet sequences of aggregate data flows can be continuously and repeatedly identified and accelerated, such as described, for example, in connection with FIG. 4E. However, unlike instances where rules, conditions, and triggers of an acceleration (or deceleration) are based on a single data flow, instances involving aggregate data flows can complicate the provision and accounting of acceleration rules, conditions, and triggers, as such conditions can be dependent on multiple, even concurrent, data flows.

For purposes of illustrating policies that can involve aggregate data flows, in one illustrative example, a particular policy can exist that limits the overall volume of video traffic a single user may access over a particular period of time. In such an example, in order to enforce and perform accounting in connection with the policy, some video is consumed by the user over data flows in data sessions managed via the SIP L7 protocol (e.g., video conferencing, perhaps), other video is consumed over data sessions managed via the RTSP L7 protocol (e.g., real time sporting events, etc.), while still other video is provided by progressive download over HTTP (e.g., movies on demand, internet video clips (such as on YouTube), etc.). Each of the available video protocols contribute to the policy concerned with the combined amount of video data consumed by the subscriber as well as particular associated rules, policies, and constraints specific to each type of video data. For instance, video-type-specific policies can dictate how and which packet sequences of which flows can be accelerated and which packet sequences cannot be accelerated. Further, various types of qualifying video data can be consumed at various times, even concurrently, by the particular user over the period. As a result, the actual instantaneous video traffic volume is not necessarily available as a single count on either a single network element, GPU, or NPU.

Where neither a GPU nor NPU have a complete view of the real-time data across the full aggregation of flows relevant to a particular policy, challenges can arise in providing correct and timely enforcement of, for example, the monthly overall video consumption policy, particularly when flow acceleration is being used. For example, it is possible that billing, policy constraints, and real-time packet arrival intervals will guarantee that some video flows for this user will never accelerate, while other flows may be accelerated from the $2^{nd}$ packet to the last packet of the flow. Therefore, policies applied to a policy involving a potential aggregate of data aggregates can involve additional special treatment in order to result in deterministic, reliable flow treatment by the billing, policy and control logic normally resident, for example, on a GPU. Events in one flow may need to result in the "deceleration" of an aggregate of flows so that the GPU can consolidate counts and apply enforcement treatments to one or more the flows. In some instances, this can be done at the granularity of the byte, for instance, where approximations are not adequate. Further, some individual flows may impact policies applied to a plurality of different aggregates. As an example, volume for one flow may count toward each of the aggregate of all permitted bytes for a user, the aggregate of all permitted video bytes for the user, as well as the aggregate of all permitted HTTP transaction bytes for the user. Any packet for such a flow might cross a threshold requiring enforcement actions across one of the other flows of one or more of these aggregates, as discussed and illustrated in more detail below.

Figure 7:
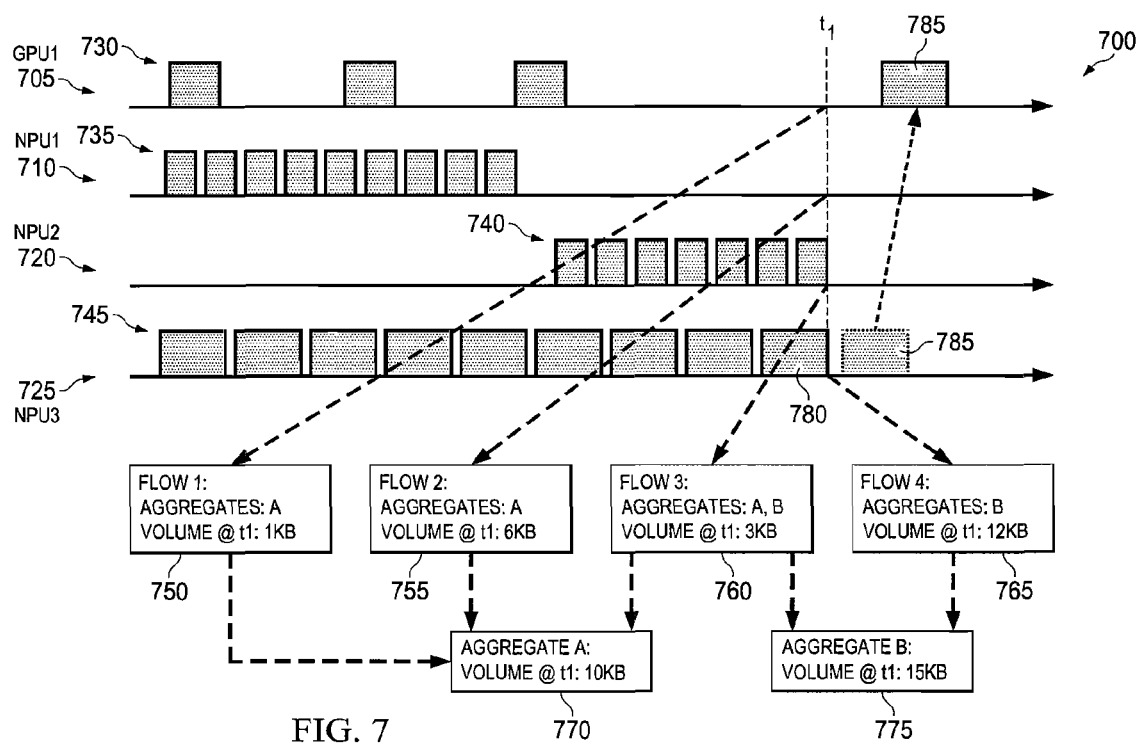
FIG. 7 is a simplified diagram illustrating a series of example interactions within an example communication system involving an aggregate flow condition.

Turning to FIG. 7, a simplified block diagram 700 is shown representing a plurality of aggregate data flows contributing to a single trigger, service condition, policy, or session. As shown in FIG. 7, at least one GPU 705 and one or more NPUs 710, 720, 725 process packets in data flows 730, 735, 740, 745 (respectively) over a period of time, in connection with the forwarding of these packets. In some instances, multiple GPUs can also be used to process packets relevant to a particular aggregate session. In some instances, two or more of NPUs 710, 720, 725 can be a single NPU. Indeed, in some examples, a single NPU can be tasked with handling all flows for a particular aggregate session, to further simplify accounting of an aggregate trigger or policy. For instance, an aggregate session or policy can apply to a particular subscriber. Accordingly, a single NPU, such as one identified as corresponding geographically to the subscriber's IP address, can be identified, and traffic consumed by the subscriber can be processed using the single NPU. In other instances, upon identifying that a particular flow is relevant to an aggregate policy (and thereby involved in an aggregate session) intelligent processing of flows can result in flows within a particular aggregate session being identified and funneled through a particular NPU. In other architectures, multiple NPUs can be used within a single aggregate session. Multiple NPUs can then coordinate, for instance, over multi-port memory, accounting of an aggregate policy or trigger.

In the particular example of FIG. 7, GPU 705 handles packets 730 in a decelerated data flow, while NPUs 710, 720, 725 handle packets 735, 740, 745 in at least partially accelerated data flows. Further, in this particular example, data flows 730, 735, 740 are relevant to a first policy of a subscriber, while data flows 740 and 745 are relevant to a second policy of a subscriber. Sessions and data flows pertaining to each of the first and second policies can, therefore, be regarded as included within aggregate sessions, and the first and second policies can be regarded as aggregate policies as they correspond to aggregate sessions. Additionally, one or more data structures can be generated and associated with a particular policy or aggregate session. For instance, as shown in the example of FIG. 7, each of flows 730, 735, 740, 745 can have one or more corresponding flow records (e.g., 750, 755, 760, 765, respectively). The flow record can track an up-to-date measurement of traffic processed and forwarded for each data flow. For instance, the flow record 755 of Flow 2 (i.e., 735) at time t/can record that a volume of six kilobytes (6 kB) of data have been processed in Flow 2 735.

Additional aggregate flow records 770, 775 can also be maintained for aggregate sessions A and B respectively. In some instances, an acceleration condition for any one of the individual data flows in an aggregate session can be based, at least in part, on an aggregate amount of data processed among data flows in the aggregate session. For instance, in connection with a second aggregate policy, an aggregate session B can be monitored using aggregate flow record 775. For instance, data flows in aggregate session B can be accelerated, conditioned upon a trigger prompting deceleration hand-offs back to one or more GPUs (e.g., 705). For instance, some flows in an aggregate session may be in an accelerated state while others are not (e.g., based on other policies applying to the individual flows in the aggregate session). Further, some flows may be handled by a GPU (e.g., 705) while other flows are handled by a NPU (e.g., 710). For instance, the accounting of a first flow may reside on the GPU while the first flow is not currently accelerated or is in transition into or out of acceleration, while a second flow is accounted for on the NPU. In some implementations, in order to account for both the first and second flows, packets participating in the aggregate session (e.g., from both the first and second flows) may all be egressed to the backplane via the NPU with special trailers identifying the implicated aggregate sessions, policies, and triggers, allowing the NPU to centrally maintain authoritative accounting across the full aggregate of flows, including flows that will never be candidates for acceleration but whose counts nonetheless affect the thresholds and triggers of a particular aggregate policy.

In one illustrative example, as shown, for instance, in FIG. 7, an aggregate trigger can be defined specifying that all accelerated flows in aggregate session B (e.g., Flow 3 (740) and Flow 4 (745)) be decelerated when the aggregate volume of data forwarded, among the aggregated data flows, reaches 15 kB. At time t1, Flow 3 (740) has only processed 3 kB, while Flow 4 (745) has processed 12 kB (as recorded in flow records 760 and 765 respectively). In isolation, neither NPU2 (720) or NPU3 (725) (or even a single NPU monitoring Flows 3 and 4 with separate flow records), would necessarily recognize that the 15 kB trigger had been reached at time t1, without coordinating the aggregate traffic volume measurements of the two flows. Indeed, at time t1, the aggregate trigger of 15 kB has been met for the flows in aggregate session B. Accordingly, functionality can be provided allowing each processing unit participating in a particular aggregate session, to monitor the aggregate session, for instance in connection with an aggregate flow deceleration trigger. Such a deceleration trigger can be used to ensure that, by the time the actual trigger threshold of the aggregated session is reached, all of the flows in the aggregate session are being accounted for on the GPU which can be more appropriately suited to applying complex enforcement actions across a plurality of flows.

In implementations including more than one NPU or both a GPU and NPU involved in an aggregate session, multiple processing units could theoretically exchange PCI messages with each other in response to the processing of each packet in aggregate data flows, to coordinate progress toward an aggregate trigger, for instance. However, in some examples, exchanging and interpreting messages sent between two (or more) processing units can have a significant impact on performance. For instance, as NPUs, in particular, can be tasked with streamlined, or accelerated, processing of data streams, it can be disadvantageous to burden NPUs with additional messaging responsibilities to coordinate tracking of aggregate session state. Accordingly, an aggregate flow record 775 can be maintained for the aggregate session B. In some instances, each NPU can generate and maintain a flow record (e.g., 755, 760, 765) in connection with acceleration of a handled data flow. GPUs can similarly generate and maintain flow records (e.g., 750).

Rather than adding to the processing responsibilities of the NPU, relative to aggregate sessions and triggers, individual flow records of a NPU can be leveraged to coordinate aggregate session status with other processing units involved in an aggregate session. For instance, as a NPU or GPU maintains a flow record for processing and/or acceleration of an individual data flow, the processing unit can update the flow record as each data flow packet is processed to track the amount of traffic processed by the processing unit in the data flow. The amount of traffic can include, for example, the volume of data (i.e., measured in bytes), or a measurement of time corresponding to the data processed (e.g., the time spent processing the data flow, duration of content (e.g., digital radio, telephony, video, etc.) streamed via the data flow, etc.). Each flow record of a data flow in an aggregate session can be linked to a corresponding aggregate flow record. Additionally, modifying or updating a flow record of a single individual flow can trigger automatic updating of aggregate flow records linked or otherwise associated with the individual flow record. As an example, as a packet 780 is received, processed, and forwarded using NPU3, flow record 765 can be updated by NPU3 to reflect the amount of data processed by packet 780. In some instance, flow record 765 can be linked to aggregate flow records (e.g., 775) associated with Flow 4 (745) so that as flow record 765 is updated, aggregate flow record 775 is updated as well to reflect the amount of data processed in connection with packet 780. In some examples, NPU3 (725) can identify that an associated aggregate flow record 775 exists for Flow 4 (745) and can modify flow record 765 as well as aggregate flow record 775 to reflect the amount of data processed in connection with packet 780.

Continuing with the preceding examples of FIG. 7, NPUs participating in an aggregate session can read the aggregate session status from the corresponding aggregate data record. For instance, upon (or following) the updating of aggregate flow record 775 to reflect the amount of data processed in connection with packet 780, NPU3 (725) can check the aggregate session status recorded in aggregate flow record 775 and compare the aggregate session status against any acceleration rules or conditions. In one example, an acceleration rule can exist, corresponding to an aggregate policy associated with aggregate session B, that dictates that acceleration sessions be ended and control returned to a GPU when an aggregate trigger has been met. In this example, the aggregate trigger can specify that control be returned to a GPU when the aggregate volume of data processed in the aggregate session B meets or exceeds 15 kB. Accordingly, upon discovering, at time t1, that the aggregate volume has met the trigger threshold of 15 kB, processing of subsequent packets received in either of Flows 3 or 4 can be delegated back to a GPU in accordance with deceleration of each flow in the aggregate session. For instance, a packet 785 can be received by NPU3 following identification that the 15 kB trigger threshold has been met, prompting NPU3 to forward the packet to GPU1 (705) for processing.

Aggregate flow records can maintain a corresponding set of triggers, as well as counters. Further, in some instances aggregate triggers can incorporate a buffer, or "fudge factor" to promote firing of the trigger prior to a critical volume or traffic threshold being reached, as processing delays can result in extra packets being processed among concurrent data flows in an aggregate session between the time a trigger is first acknowledged and a deceleration request issued and deceleration initiated for all data flows in an aggregate session. For instance, for a volume-based trigger set ideally to fire at 500 kB, a 50 kB buffer can be provided to assist in ensuring that the trigger fires close to the ideal but never in excess of the 500 kB threshold.

Further, there can be an M to N relationship between individual data flows (sessions on a NPU) and aggregate sessions. Direct references or links can be provided in both directions (e.g., using pointers, indexes, handles, etc.). Accelerated flows can have their volume (or flow time) accounted for on the NPU handling the flow. Non-accelerated flows can have their volume accounted for on the GPU involved with processing the non-accelerated flow. Aggregate records on the NPU allow the system to accelerate flows that belong to an aggregate object, while still allowing for GPUs to properly account for aggregate volumes. Such a design can ensure that there are no accelerated flows on an aggregate session when a policy event occurs, such as billing-related event.

GPUs (e.g., 705) can also utilize and consult aggregate session records, for instance, in connection with determining that a particular flow can be accelerated. For instance, a first packet can be received in a first data flow and forwarded to a GPU for high-level processing. In connection with the high-level processing of the first packet, the GPU can identify that the first data flow is associated with a particular aggregate session. The GPU can then identify and read an aggregation record associated with the particular aggregate session to determine the aggregate session status and determine whether it would be appropriate to accelerate the first data flow using a NPU. For instance, the GPU can identify that an aggregate trigger of an aggregate session is about to be reached and determine that acceleration of the first data flow should be delayed.

If a GPU determines that a data flow, identified as associated with a particular aggregate session, can be accelerated, the GPU can provide a NPU with instructions for accelerating the data flow, such as via a trailer to a packet of the data flow routed to the backplane by the GPU via the NPU. The acceleration instructions can include an aggregate identifier (ID) that can be used by the NPU to identify and link to a corresponding aggregate flow record. In instances where the aggregate session is already in progress (i.e., when one other data flow has already been initiated within the same aggregate session), the GPU can identify the already-generated aggregate flow record and aggregate ID for the NPU. In instances where the data flow will be the first data flow in the aggregate session, the GPU can create the corresponding aggregate flow record and generate an aggregate ID corresponding to the aggregate session. In addition, if the GPU, during high-level processing of the first data flow, has been responsible for forwarding some of the packets in the first data flow, the GPU can generate or update the aggregate flow record according to the amount of traffic processed by the GPU (e.g., at 730) prior to handing over control of the flow to the NPU (e.g., 720).

In some implementations, a flow record of an individual data flow can include an associated statistics record used to track statistical information for the data flow, including tracking measurements of the amount of traffic processed in the flow. In one particular example of an aggregate flow record 800, such as represented in the block diagram of FIG. 8, the aggregate flow record 800 can be referenced by the flow record statistics 810, 815 of one or more flow records 820, 825. In turn, flow records (and flow record statistics) can be also be referenced by the aggregate flow record 800. In such instances, all of the affected flow IDs and aggregate IDs can be tracked as packets are forwarded for a flow when an aggregate session is triggered. A NPU can be tasked with implementing a table of aggregation records, which correlate flows to aggregation sessions. The NPU can also update aggregation records per instructions of the GPU. Further, the NPU can read session status from the aggregate records and initiate deceleration of all related flows upon detecting an aggregate trigger condition. Aggregate flow records can be used to ensure that all flows in an aggregate session are in the decelerated state before any event on the aggregate is triggered. Further, GPUs can possess the ability, through the use of an aggregate flow record, to task for the deceleration of a group of flows with a single message, rather than sending a deceleration request message for each flow in the aggregation session.

In one particular implementation, PCI messaging can be used for out-of-band communication of events, which affect both aggregates and flow records. For instance, a decelerate aggregate request can be sent from the GPU to one or more NPUs specifying aggregate IDs, requesting to lookup the aggregate records associated with the specified aggregate IDs, and decelerate all of the flows on each aggregate record. Further, a modify aggregate record message can be sent from a GPU to a NPU requesting to alter the trigger value stored in an aggregate record maintained by the NPU. This can be used when an event occurs on the GPU that changes the volume threshold or trigger conditions for an aggregate session. This in turn can mean that the trigger volume on the corresponding aggregate record also be changed. To avoid "race" conditions while accessing PCI memory (i.e., where two separate event occur substantially concurrently, e.g., one at the GPU and another at the NPU), the NPU can make all updates to the aggregate records once the corresponding aggregate IDs are used in acceleration instructions received from the GPU. The GPU can send the NPU a modify aggregate record request, for example, to alter the trigger volume, the NPU making the update.

One or more aggregate threshold triggers can be associated with a given aggregate session. For instance, an aggregate session can have any combination of the independent aggregate triggers including volume-based and time-based thresholds, including thresholds at the service level. To accelerate flows that have aggregate volume thresholds, a GPU will assign an aggregate id to each aggregate object being accelerated. An acceleration check function check_acceleration( ) can be initiated or called that can be responsible for determining if an aggregate threshold applies to a flow, acquiring/retrieving the aggregate ID, and evaluating the aggregate ID's usability. Further, check_acceleration( ) can check for volume aggregates that apply to a flow. If an aggregate has multiple volume thresholds, the minimum volume threshold will be used for the aggregate trigger. For example, if a user has a service level set to 15,000 bytes and remaining user volume threshold at 50,000 bytes, then the service level volume will be used. If the same flow has a service group volume threshold set to 60,000 bytes, then 2 aggregate IDs can be associated with the flow. The check_acceleration( ) function can also be used to check the early trigger buffer, or "fudge factor." For instance, an aggregate session can be initialized to trigger an interval of volume early (i.e., before a critical volume is actually reached by data flows in the aggregate session).

When check_acceleration( ) first checks for aggregate volume triggers, it can first try to retrieve an aggregate ID for the aggregate session. If the aggregate object does not already have an aggregate ID, check_acceleration( ) can acquire one, for example, via an API, associate that aggregate ID with the aggregate session (for instance in an aggregate object data structure associated with the aggregate session), and initialize the shared memory location (or aggregate flow table) of that aggregate with the aggregate trigger value. Further, if check_acceleration( ) finds that an aggregate session already has an aggregate ID, it can first evaluate if the aggregate session can support another flow. For instance, there can be a defined maximum number of flows that each aggregate ID can point to. For instance, if the current flow count for the aggregate ID has reached the max value, the flow will not be accelerated. Additionally, if check_acceleration( ) finds that a data flow session associates with more than one aggregate ID (and therefore multiple aggregate sessions), it can ensure the acceleration instructions for the data flow has room for the total number of aggregate IDs associated with the flow. In some instances, there can be a defined max value for how many aggregate IDs (and aggregate sessions) can be associated with a single flow. If a flow has reached the max value, for example, a decision can be made not to accelerate the flow, as the system may not be equipped to monitor the status of every aggregate session with which the flow is associated.

Acceleration instructions, or instructions from the GPU requesting a change to the acceleration instructions, can include identification of one or more aggregate IDs. For instance, on a flow trailer including acceleration instructions, an aggregate ID can represent the aggregate records that the flow is participating on, and each of these records can have their trigger value updated for every packet in the flow, including the packet that arrived with the trailer. On a modify instructions request, aggregate IDs can also represent aggregate records that should be updated to include, for example, a renewed trigger threshold value for the aggregate session also included in the modification request.

A GPU can initiate deceleration of all data flows actively accelerated in a particular aggregate session. A GPU may initiate deceleration, for example, in connection with the detection of one or more events detected via external interfaces to the GPU. Such events can include, for example, a volume threshold update, enabling of quality of service (QoS), service stop request from an associated quota server; quota return request from the quota server, the addition or removal of a service group, etc. In such cases, the GPU may need to be tracking statistics for all of the flows in order to perform the event. Before performing the event, GPU can call a function to decelerate all accelerated flows in an aggregate group. A callback function can also be provided to be called once all of the flows have been decelerated. The PPC can then make the necessary changes and then re-evaluate if further flows should be accelerated.

Non-accelerated data flows can also participate in an aggregate session with accelerated flows. For instance, certain data flows can be processed by a GPU and then routed to a NPU for forwarding onto the backplane. In order to identify to the NPU that packets of the non-accelerated data flow belong to a particular aggregate session, the packets can be tagged with aggregate IDs of the aggregate session. In some instances, the NPU can be tasked with updating the aggregate record in accordance with non-accelerated packet routed through the NPU by the GPU.

In some implementations, ingress packets received by a NPU can be passed to a lookup engine implemented in connection with the NPU. The lookup engine can be used to match each flow to a flow record. Identifying the ingress packet's corresponding flow path allows the NPU to correctly update the flow statistics of the flow record to account for the amount of data processed in the ingress packet. With the addition of aggregates, additional records may also need to be updated. As an update can cause triggers to fire, in some implementations, it may be desirable to update aggregate flow records prior to updating the statistics entry in the flow-specific flow record in response to a newly received packet. Accordingly, in some instances, ingress packets can be processed according to a particular order, such as: finding a matching flow, updating corresponding aggregate records, checking all triggers, decelerating flows if triggered, updating individual flow record statistics if not triggered.

A NPU can unilaterally initiate deceleration of its flow in response to identifying, from an aggregate flow record, that a trigger has been reached. Further, the NPU, when passing the first decelerated packet to the GPU, can append a deceleration message to the packet to notify the GPU that data flows in an aggregate session should be decelerated. The GPU, in response to the deceleration message, can identify each data flow in the triggered aggregate session and check to see if any data flows in the aggregate session remain in an accelerated state. The GPU can issue a deceleration command to any data flow sessions in the aggregate session that remain in an accelerated state. Some other accelerated flows in an aggregate session may also identify that the trigger has been reached and commence unilateral deceleration of their flows prior to the deceleration command being generated and sent to NPUs responsible for the data flows, although other accelerated data flows may not, allowing the data flows to be decelerated before additional packets are received. Further, in connection with deceleration of flows in an aggregate session, a session delete function can be called by the GPU to remove the flow index from each of the aggregate records affected by that flow, and then free the flow record for another aggregate session.

To update the aggregate records for multiple flows in multiple micro engines, a record locking strategy may need to be employed that will avoid deadlocks and promote parallel access corresponding to aggregate flow record updates by multiple concurrent flows. For instance, a single flow can be limited to a particular number of aggregate sessions, limiting the number of aggregate records that would need to be locked, accessed, and updated in connection with updates at the flow. A corresponding NPU can request that all aggregate flow records for the aggregate sessions of a particular data flow be locked in parallel, and then process each lock as each respective aggregate flow record becomes available. The NPU can then update each of the aggregate flow records. Once each aggregate flow record update is complete, the corresponding lock can be freed before beginning the processing of updates and locks of other aggregate flow records for the flow.

Further, in some implementations, it can be desirable to funnel all flows for a particular aggregate session, for instance, to avoid burdening NPUs with record locking and other inter-NPU coordination tasks. Indeed, in some implementations, a condition for acceleration of one or more flows in an aggregate session can be that all flows in the session are handled by a single NPU. As a statistical matter, such a condition could result in some lost opportunities to accelerate flows in an aggregate session. For instance, a particular subscriber may have both IPv4 and IPv6 flows mapped to different NPUs. Such flows could be handled by the multiple NPUs through cross communication between the NPUs, or by forwarding of traffic from one of the NPUs to another NPU tasked with accounting for the aggregate sessions, but such coordination tasks can reduce the efficiency of the involved NPUs. Accordingly, in some implementations, a rule can be in place that denies acceleration of data flows in an aggregate session involving multiple NPUs, based on a calculation that the loss in efficiency from coordinating handling between NPUs is statistically more significant that the loss in efficiency of refusing to accelerate flows involved in such a multi-NPU aggregate session.

Figure 8:
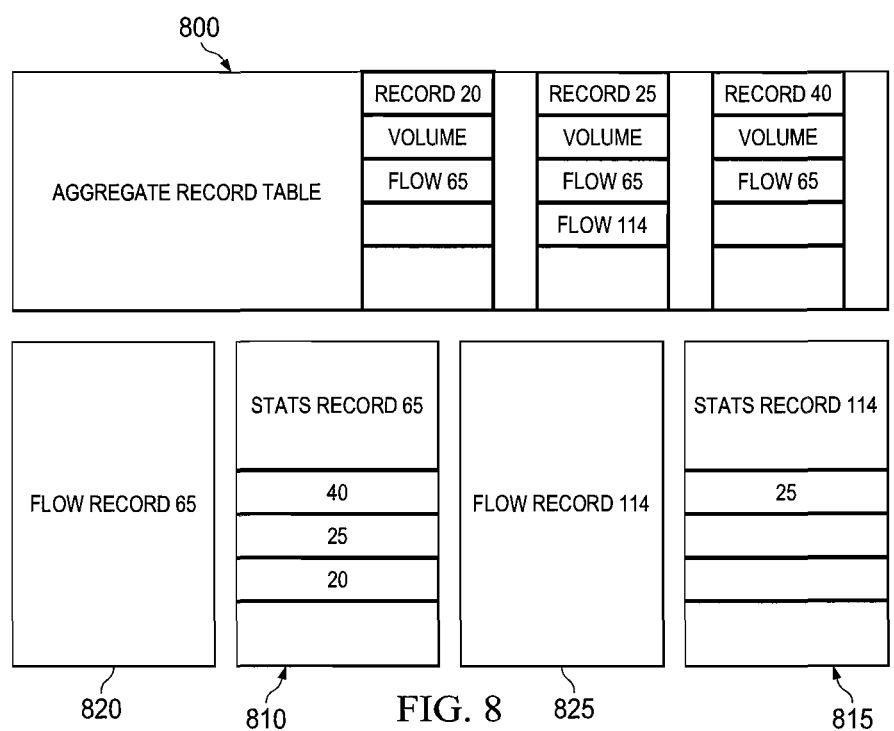
FIG. 8 is a simplified representation of an example aggregate flow record.

It should be appreciated that the examples of FIGS. 7 and 8 are simplified examples, provided solely to illustrate certain particular features and principles. It should be understood, for example, that aggregate sessions can involve fewer or more processing units than illustrated in the examples of FIG. 7. For instance, a single NPU can handle and maintain multiple data flows, including data flows within a single aggregate session. Further, it should be understood that flow records and aggregate flow records illustrated in FIGS. 7 and 8 are but very simplified representations of flow records and some of the content that can be included, memorialized, or communicated, using a flow record or aggregate flow record.

Figure 9A:
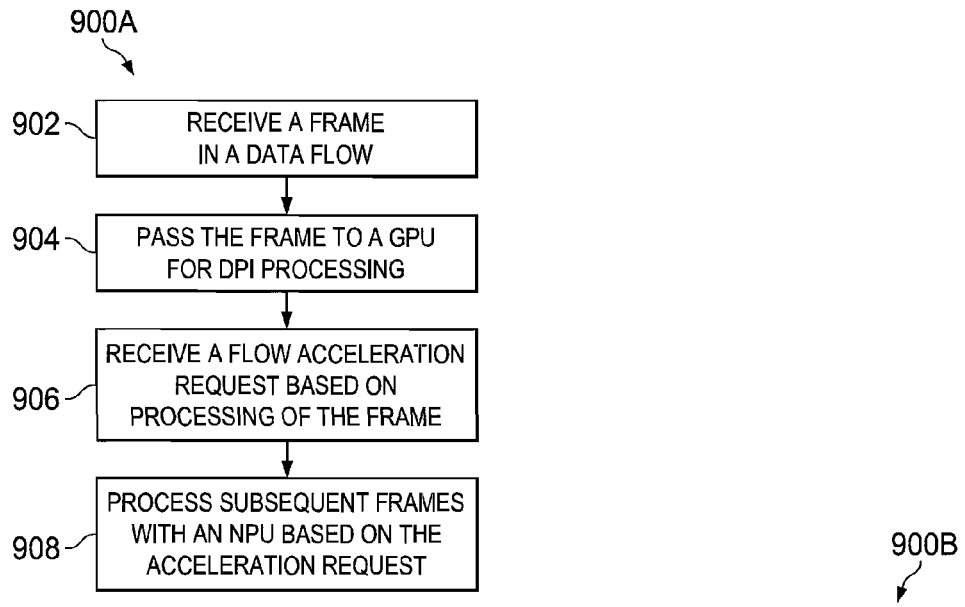
FIGS. 9A-9D are simplified flowcharts illustrating example techniques relating to selective packet acceleration in a network environment.

FIGS. 9A-9D are simplified flowcharts 900a-d showing some example techniques associated with selectively accelerating packets using network devices similar to those illustrated and described above. Turning to FIG. 9A, one or more frames in a data flow can be received 902 at a NPU and then passed 904 to a GPU to perform at least one DPI operation on the one or more frames. A flow acceleration request can be generated based on the DPI operation and received 906 by a NPU. The acceleration request can be parsed to identify a set of conditions for accelerated processing of subsequent frames of the data flow by the NPU, of a set of frames in the first data flow. Accordingly, at least one subsequent frame in the set of frames can be processed 908 by the NPU in connection with forwarding of the subsequent frame to at least one remote network node, wherein processing of the at least one subsequent frame is accelerated relative to processing of the at least one first frame and based, at least in part, on the set of conditions.

Figure 9B:
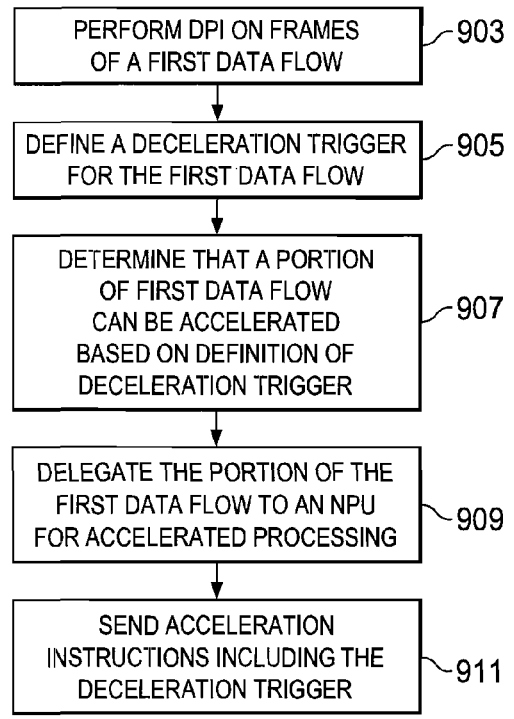

FIG. 9B, an example technique is shown in connection with identifying whether opportunities exist to accelerate sequences of packets within a given data flow. Deep packet inspection is performed 903 on at least one first frame of a first data flow by a general processing unit to at least determine whether a subsequent portion of the first data flow can be delegated to a network processing unit for accelerated processing. A first deceleration trigger can be defined 905, from the deep packet inspection, a one or more deceleration triggers for the first data flow. The first deceleration trigger can define one or more conditions that, when met during accelerated processing of a portion of the first data flow, prompts returning processing of the first data flow from the network processing unit to the general processing unit. Trigger conditions can be based on such characteristics as an identification of the type of payload data, a defined chunk of payload having a logical endpoint, etc. It can be further determined 907, based on the definition 905 of the deceleration trigger, that a subsequent portion of the first data flow can be accelerated using a network processing unit. Accordingly, the subsequent portion of the first data flow can then be delegated 909 to a network processing unit for accelerated processing based, at least in part, on the defining of the first deceleration trigger. Indeed, acceleration instructions can be sent 911 in connection with the delegation 909 of the subsequent portion of the first data flow requesting acceleration of the subsequent portion and specifying the deceleration trigger.

Figure 9C:
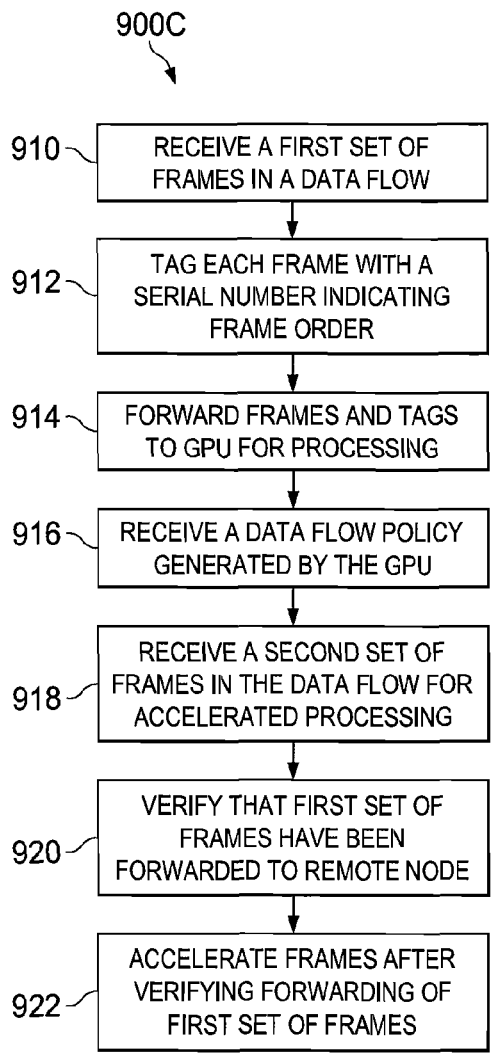

Turning now to FIG. 9C, a first set of frames of a first data flow can be received 910 by a NPU. Each frame in the first set can be tagged 912 with a respective assigned serial number identifying an ordering of frames in the first set of frames. The first of frames, and assigned serial number tags, can then be forwarded 914 to the GPU. The GPU can process the first set of frames prior to the first set of frames being forwarded on, for example, by the NPU, to at least one remote network element or node. Further, a data flow policy can be generated by the GPU and received 916 by the NPU. A data flow policy can include conditions, triggers, and rules dictating the acceleration of subsequent packets in the first data flow. The data flow policy can be generated by the GPU based at least in part on the GPU processing of the first set of packets. A second set of frames in the first data flow can be received 918 by the NPU subsequent to receiving the first set of frames and forwarding 914 the first set of frames to the GPU. The NPU can verify 920, based at least in part on the serial numbers assigned 912 to the first set of frames, that each frame in the first set of frames has been sent to the remote network element. Upon verifying 920 that the first set of frames have been processed and egressed the network element, the NPU can accelerate 922 processing of frames in the second set of frames, including sending the second set of frames to the remote network element using the NPU and bypassing processing by the GPU. Frames in the second set can be accelerated 922 by the NPU in accordance with the received data flow policy.

Figure 9D:
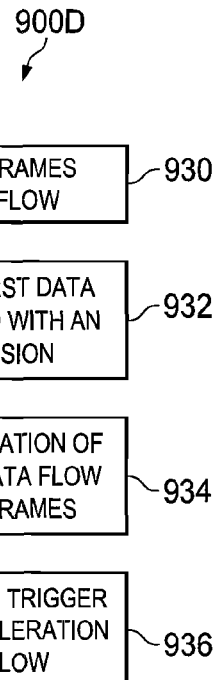

Turning to FIG. 9D, DPI can be performed 930 on at least one first frame of a first data flow by a GPU. The first data flow can be determined 932 to be associated with an aggregate session, where the aggregate session corresponds to a first set of aggregate data flows including the first data flow and at least one other data flow in addition to the first data flow. Acceleration of portions of the first data flow can be authorized 934, based, at least in part, on the DPI performed on the at least one first frame. Further an aggregate trigger can be identified 936 for data flows in the aggregate session, the aggregate trigger defining that the acceleration of at least the first data flow be halted in response to an aggregate threshold amount of traffic being detected among the first set of aggregate data flows. In some instances, aggregate traffic amounts can be identified by accessing and reading an aggregate flow record indexed to the aggregate session.

Note that in certain example implementations, the switching functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 2) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIG. 2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, network elements (e.g., 205) and content aware processing elements (e.g., 115) can include software in order to achieve the switching functions outlined herein. These activities can be facilitated, for example, by mobile data center 121 and/or network elements 122a-g, and/or any of the elements illustrated, described, or mentioned in connection with FIGS. 1-8. Such elements can also include memory elements for storing information to be used in achieving switching control functions. Additionally, such elements may include one or more processors that can execute software or an algorithm to perform switching activities in connection with the features discussed in this Specification. These devices may further keep information in any suitable memory element (random access memory (RAM), ROM, EPROM, EEPROM, ASIC, etc.), software, hardware, or in any other suitable component, device, element, or object, including non-transitory machine-readable media, where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of clouds, networks, and/or switches, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where GPU 235a-b and NPU 225a-b are provided within the same network element, such processing units can be provided in separate network elements, or be further integrated, such as by disposing both NPU and GPU processing units on a single chip, for instance.

It is also important to note that the steps discussed with reference to FIGS. 9A-9D illustrate only some of the possible scenarios that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in conferencing environments or arrangements, the present disclosure may be used in any communications environment that could benefit from such technology. Virtually any configuration that seeks to intelligently switch packets could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    inspecting at least one first frame of a first data flow to at least determine whether a subsequent portion of the first data flow can be delegated to a network processing unit for accelerated processing;
    delegating a first subsequent portion of the first data flow to the network processing unit for accelerated processing based, at least in part, on a first deceleration trigger for the first data flow; and
    causing the at least one first frame to be sent, to the network processing unit, with acceleration instructions defining at least one first condition that prompts returning processing of the first data flow from the network processing unit to a general processing unit.

2. The method of claim 1, wherein the acceleration instructions are attached to the at least one first frame.

3. The method of claim 2, wherein the network processing unit strips the acceleration instructions from the first frame prior to forwarding the first frame to a remote computing device.

4. The method of claim 1, further comprising:
    inspecting at least one particular frame of a second data flow by the general processing unit to at least determine whether a subsequent portion of the second data flow can be delegated to the network processing unit for accelerated processing;
    determining, from the inspection of the particular frame, that no deceleration triggers are available for the second data flow; and
    determining that the second data flow cannot be accelerated based, at least in part, on the determination that no deceleration triggers are available for the second data flow.

5. The method of claim 4, further comprising processing each subsequent frame in the second data flow using the general processing unit in response to the determination that the second data flow cannot be accelerated.

6. The method of claim 1, further comprising receiving a particular frame in the first data flow forwarded to the general processing unit by the network processing unit in response to the first deceleration trigger being met, wherein the particular frame was received by the network processing unit after delegation of the first subsequent portion of the first data flow to the network processing unit for accelerated processing.

7. The method of claim 6, further comprising inspecting at least the particular frame, using the general processing unit, to at least determine whether another subsequent portion of the first data flow can be delegated to the network processing unit for accelerated processing.

8. The method of claim 7, further comprising:
    defining a second deceleration trigger for the first data flow; and
    delegating another subsequent portion of the first data flow to the network processing unit for accelerated processing based, at least in part, on the defining of the second deceleration trigger.

9. The method of claim 7, further comprising:
    determining that no additional deceleration triggers are available for the first data flow; and
    determining that other subsequent portions of the first data flow cannot be accelerated based, at least in part, on the determination that no additional deceleration triggers are available for the first data flow.

10. The method of claim 1, wherein the general processing unit defines the first deceleration trigger.

11. The method of claim 1, wherein accelerated processing of the first subsequent portion of the first data flow includes:
    receiving each frame in the first subsequent portion at the network processing unit; and
    forwarding each frame in the first subsequent portion to at least one remote computing device using the network processing unit, wherein accelerated processing of the first subsequent portion results in each frame in the first subsequent portion being forwarded by the network processing unit without processing by the general processing unit.

12. The method of claim 1, wherein the first deceleration trigger is a time-based trigger.

13. The method of claim 1, wherein the first deceleration trigger is a data volume-based trigger.

14. The method of claim 1, further comprising receiving the at least one first frame from a remote computing device via the network processing unit.

15. The method of claim 1, further comprising forwarding the at least one first frame to a remote computing device, via the network processing unit, following the inspection of the at least one first frame.

16. Logic encoded in non-transitory media that includes code for execution and when executed by a processor is operable to perform operations comprising:

inspecting at least one first frame of a first data flow to at least determine whether a subsequent portion of the first data flow can be delegated to a network processing unit for accelerated processing;

delegating a first subsequent portion of the first data flow to the network processing unit for accelerated processing based, at least in part, on a first deceleration trigger for the first data flow; and causing the at least one first frame to be sent, to the network processing unit, with acceleration instructions defining at least one first condition that prompts returning processing of the first data flow from the network processing unit to a general processing unit.

17. A system comprising:
at least one memory element for storing data;
at least one network processor configured to:
perform accelerated processing for frames in a received data flow based at least in part on acceleration instructions sent with at least one frame in the received data flow;
at least one general processor configured to:
perform a set of deep packet inspection operations on at least a particular portion of frames of the received data flow, wherein at least one deceleration trigger is provided for the received data flow; and
determine whether a subsequent portion of the received data flow can be delegated to the network processor for accelerated processing based at least in part on the at least one deceleration trigger for the received data flow.

18. The system of claim 17, wherein the system comprises a gateway router for a network.

19. The system of claim 17, further comprising:
an in-band communication link between the network processor and the general processor; and
an out-of-band communication link between the network processor and the general processor.

* * * * *